(12) United States Patent
Yim et al.

(10) Patent No.: US 11,141,868 B2
(45) Date of Patent: Oct. 12, 2021

(54) RECONFIGURABLE STRUCTURAL MEMBER AND SYSTEM

(71) Applicant: THE TRUSTEES OF THE UNIVERSITY OF PENNSYLVANIA, Philadelphia, PA (US)

(72) Inventors: Mark Yim, St. Davids, PA (US); Brian John Zhang, Wilmington, DE (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 0 days.

(21) Appl. No.: 15/769,523

(22) PCT Filed: Oct. 20, 2016

(86) PCT No.: PCT/US2016/057887
§ 371 (c)(1),
(2) Date: Apr. 19, 2018

(87) PCT Pub. No.: WO2017/070329
PCT Pub. Date: Apr. 27, 2017

(65) Prior Publication Data
US 2018/0304477 A1 Oct. 25, 2018

Related U.S. Application Data

(60) Provisional application No. 62/245,461, filed on Oct. 23, 2015.

(51) Int. Cl.
*F16M 11/04* (2006.01)
*B25J 17/02* (2006.01)
(Continued)

(52) U.S. Cl.
CPC .............. *B25J 17/025* (2013.01); *B25J 9/08* (2013.01); *B25J 9/1065* (2013.01); *B25J 17/00* (2013.01);
(Continued)

(58) Field of Classification Search
CPC .............. F16M 11/04; F16M 11/2092; F16M 2200/063; F16M 11/10; F16M 11/2014;
(Continued)

(56) References Cited

U.S. PATENT DOCUMENTS 4,208,028 A * 6/1980 Brown ................... F16M 13/04
224/185
4,695,024 A * 9/1987 Haven ................... A61B 6/447
248/280.11
(Continued)

FOREIGN PATENT DOCUMENTS

WO 2015/112815 A1 7/2015

*Primary Examiner* — Brian E Glessner
*Assistant Examiner* — Daniel J Kenny
(74) *Attorney, Agent, or Firm* — BakerHostetler

(57) ABSTRACT

A joint attachment system for a reconfigurable truss includes a first joint attachment having a first pivot axis and a second joint attachment having a second pivot axis. The first joint attachment and second joint attachment form a concentric spherical joint linkage when attached to a first body member and a second body member, respectively. The first pivot axis of the first joint attachment intersects the second pivot axis of the second joint attachment at a single point X which defines a center of the concentric spherical joint linkage. The concentric spherical joint linkage is configured to allow the addition of one or more joint attachments and body members to the truss node. In addition, the concentric spherical joint linkage is configured to allow the removal of one or more joint attachments and body members from the truss node.

21 Claims, 19 Drawing Sheets

(51) Int. Cl.
*B25J 9/10* (2006.01)
*E04B 1/19* (2006.01)
*F16C 11/04* (2006.01)
*B25J 17/00* (2006.01)
*B25J 9/08* (2006.01)
*E04B 1/41* (2006.01)
*E04C 3/02* (2006.01)
*F16B 1/00* (2006.01)
*F16B 11/00* (2006.01)

(52) U.S. Cl.
CPC ......... *B25J 17/0283* (2013.01); *E04B 1/1903* (2013.01); *E04B 1/40* (2013.01); *E04C 3/02* (2013.01); *F16C 11/04* (2013.01); *E04B 2001/1927* (2013.01); *E04B 2001/1957* (2013.01); *E04B 2001/1975* (2013.01); *F16B 1/00* (2013.01); *F16B 11/006* (2013.01); *F16B 2001/0035* (2013.01)

(58) Field of Classification Search
CPC ...... B25J 17/025; B25J 9/1065; B25J 9/0283; E04B 1/00; E04C 3/02
USPC ............................ 248/281.11, 277.1; 52/646
See application file for complete search history.

(56) References Cited

U.S. PATENT DOCUMENTS

| | | | | |
|---|---|---|---|---|
| 4,732,525 | A | | 3/1988 | Neumann |
| 4,942,700 | A | * | 7/1990 | Hoberman ............ E04B 1/3211 52/109 |
| 5,657,584 | A | | 8/1997 | Hamlin |
| 5,701,713 | A | * | 12/1997 | Silver ..................... E04C 3/005 52/639 |
| 6,030,130 | A | * | 2/2000 | Paddock ............. F16M 11/2014 248/278.1 |
| 6,095,011 | A | * | 8/2000 | Brogårdh ............... B25J 9/1065 74/490.03 |
| 8,342,467 | B2 | * | 1/2013 | Stachowski .............. A61B 8/00 248/280.11 |
| 9,568,149 | B2 | * | 2/2017 | Vance .................. F16M 11/048 |
| 10,353,165 | B2 | * | 7/2019 | Yi |
| 2003/0053901 | A1 | | 3/2003 | Roy et al. |
| 2005/0199085 | A1 | | 9/2005 | Isobe et al. |
| 2006/0243085 | A1 | | 11/2006 | Hannaford et al. |
| 2015/0328397 | A1 | * | 11/2015 | Bally .................. A61M 5/1415 211/85.13 |
| 2015/0352727 | A1 | * | 12/2015 | Sato ........................ B25J 17/00 74/490.05 |

\* cited by examiner

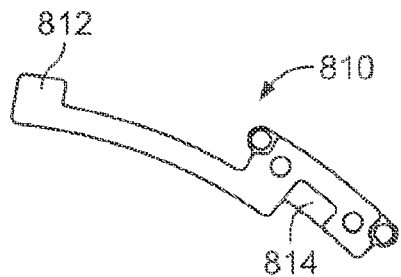
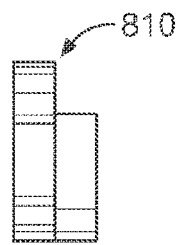
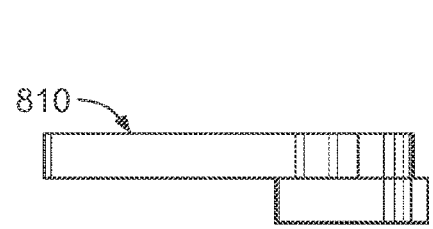
FIG. 23A  FIG. 23B  FIG. 23C
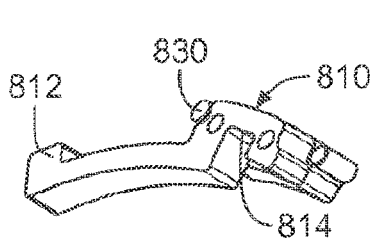
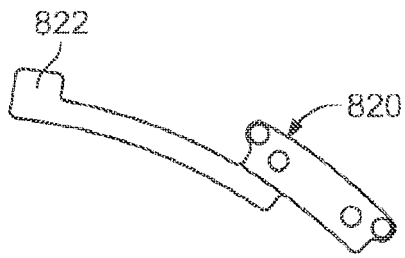
FIG. 23D  FIG. 23E
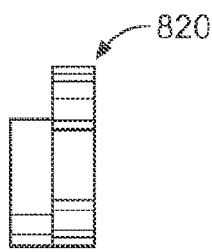
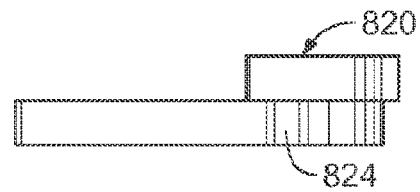
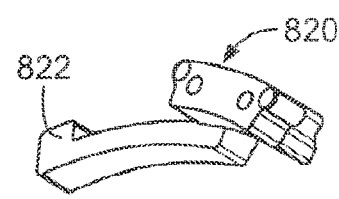
FIG. 23F  FIG. 23G  FIG. 23H
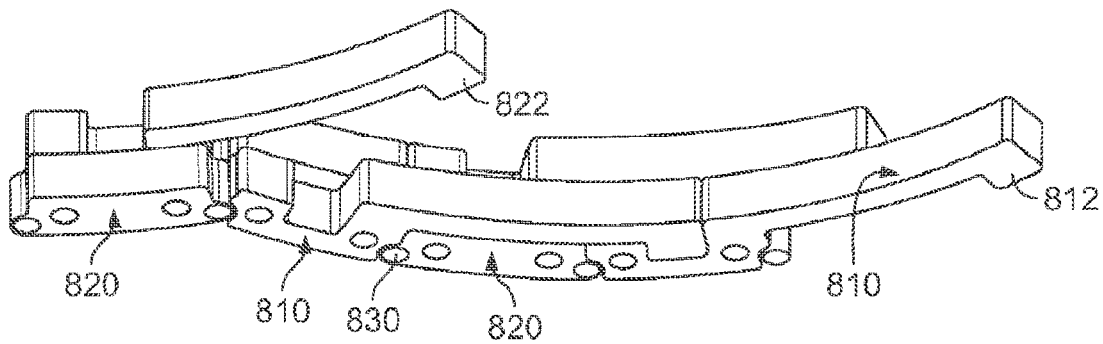
FIG. 23I

RECONFIGURABLE STRUCTURAL MEMBER AND SYSTEM

CROSS-REFERENCE TO RELATED APPLICATIONS

This application is the National Stage Application of International Patent Application No. PCT/US2016/057887, filed Oct. 20, 2016, which claims the benefit of and claims priority to U.S. Provisional Application Ser. No. 62/245,461, filed Oct. 23, 2015, the contents of which are incorporated by reference in their entireties for any and all purposes.

FIELD

The present disclosure relates generally to truss systems and more specifically to a reconfigurable truss member and reconfigurable truss system.

BACKGROUND

Trusses are structural elements frequently used in the construction of buildings, bridges, cranes and other structures. Many trusses consist of fixed members that are bolted or welded together, giving the structure a fixed, rigid shape.

Variable geometry trusses have been proposed which allow the shape of the truss to be changed. For example, U.S. Pat. No. 5,657,584 to Hamlin teaches a truss made up of multiple concentric spherical joint mechanisms. Each concentric spherical joint mechanism is formed of individual joint mechanisms having fixed length members. Each fixed length member is connected to another fixed length member at a pivot point. Each joint mechanism can be attached to two or more identical joint mechanisms to form a concentric spherical joint mechanism. Each of the interconnected joint mechanisms has members associated with axes of rotation that coincide with axes of rotation of the other joint mechanisms. All of the axes of rotation intersect at a single point, creating the concentric spherical joint mechanism. Multiple concentric spherical joint mechanisms can be linked to one another to form a truss frame.

Truss frames that are constructed with the joint mechanisms taught in the '584 Patent can expand and contract in size. However, the ability to vary the geometry of such trusses is limited by a number of factors. First, the structural members themselves have a fixed length. This severely limits the ability to adjust the geometry and size of the truss. Second, the pivot joints only connect a single pair of structural members. This factor, combined with the fact that each joint mechanism is identically configured, creates a "closed" system that does not permit the addition or subtraction of structural members to or from the truss in order to reconfigure the truss. This inability to reconfigure the truss, e.g. expand the truss by adding on additional components, severely limits the range of applications in which the truss can be utilized.

SUMMARY

The drawbacks of conventional truss systems and truss members are avoided in many respects by truss systems and truss members in accordance with the invention.

One beneficial aspect or embodiment of the invention features a truss member that includes a body member comprising a first end and a second end. The truss member also includes a first joint attachment at the first end of the body member and a second joint attachment at the second end of the body member.

In another beneficial aspect or embodiment of the invention, a structural member features a first joint attachment and a second joint attachment, each joint attachment having a first segment pivotally coupled to a second segment.

In another beneficial aspect or embodiment of the invention, a structural member features a first segment with a first radius of curvature and a second segment with a second radius of curvature that is greater than the first radius of curvature.

In another beneficial aspect or embodiment of the invention, a structural member includes a first segment and a second segment, each segment having a base end and a free end, wherein the base end of the first segment is pivotally coupled to the base end of the second segment.

In another beneficial aspect or embodiment of the invention, a structural member includes a free end of a first segment that features a first connector, and a free end of a second segment that features a second connector, the second connector adapted to connect with a first connector associated with another structural member.

In another beneficial aspect or embodiment of the invention, the structural member includes a first connector with one of a male connector and a female connector, and the second connector includes the other of a male connector and a female connector.

In another beneficial aspect or embodiment of the invention, the structural member includes a male connector in the form of a plug and a female connector in the form of a socket.

In another beneficial aspect or embodiment of the invention, a structural member includes a plug featuring a cone-shaped extension, the structural member also including a socket featuring a circular aperture.

In another beneficial aspect or embodiment of the invention, a structural member includes a plug featuring a reduced diameter section forming a groove adapted to engage a female connector in a latched condition.

In another beneficial aspect or embodiment of the invention, a structural member includes a first connector and a second connector that are genderless connectors.

In another beneficial aspect or embodiment of the invention, a structural member includes a second connector adapted to connect with a first connector associated with another structural member by magnetic or electrostatic forces.

In another beneficial aspect or embodiment of the invention, a structural member includes a second connector adapted to connect with a first connector associated with another structural member by chemical bonds, an adhesive, van der Waals forces or a phase change material.

In another beneficial aspect or embodiment of the invention, a structural member includes a second connector adapted to connect with a first connector associated with another structural member by a mechanical connection.

In another beneficial aspect or embodiment of the invention, a structural member includes a second connector adapted to connect with a first connector associated with another structural member by a mechanical connection, the mechanical connection featuring a press fit connection.

In another beneficial aspect or embodiment of the invention, a structural member includes a second connector adapted to connect with a first connector associated with another structural member by a mechanical connection, the mechanical connection featuring an interference fit.

In another beneficial aspect or embodiment of the invention, a structural member includes a second segment that features an inner member and an outer member.

In another beneficial aspect or embodiment of the invention, a structural member features an inner member pivotally coupled to a first segment at a first pivotal coupling, the structural member also featuring an outer member pivotally coupled to the first segment at a second pivotal coupling, the first pivotal coupling being offset from the second pivotal coupling along a length of the first segment.

In another beneficial aspect or embodiment of the invention, a structural member features an inner member and an outer member, each inner member and outer member including a female connector that defines an aperture passing completely therethrough, the aperture of the inner member adapted to partially or complete align with the aperture of the outer member dependent on the orientation of a second segment relative to a first segment.

In another beneficial aspect or embodiment of the invention, a structural member includes a second segment that is pivotable with respect to a first segment between an open condition, in which the apertures through the inner member and outer member are axially aligned with one another, and a closed condition, in which the apertures through the inner member and outer member are axially offset from one another.

In another beneficial aspect or embodiment of the invention, a structural member includes a second segment that is positioned in an open condition when a base end of the second segment is oriented at a release angle Θ relative to the base end of a first segment.

In another beneficial aspect or embodiment of the invention, a structural member includes a second segment that is positioned in an open condition when a base end of the second segment is oriented at a release angle Θ relative to the base end of a first segment, the release angle Θ being 180 degrees.

In another beneficial aspect or embodiment of the invention, a structural member includes a joint attachment with first and second segments that span a curve of 90 degrees in an open condition.

In another beneficial aspect or embodiment of the invention, a structural member includes a joint attachment with first and second segments that span a curve of 180 degrees in an open condition.

In another beneficial aspect or embodiment of the invention, a structural member includes a second segment that is positioned in a closed condition when a base end of the second segment is oriented at an angle that is less than a release angle Θ relative to a base end of the first segment, and when the base end of the second segment is oriented at an angle that is greater than the release angle Θ relative to the base end of the first segment.

In another beneficial aspect or embodiment of the invention, a structural member includes a spring that biases a second segment toward an open condition.

In another beneficial aspect or embodiment of the invention, a structural member includes an inner member and an outer member, wherein one of the inner member and outer member has a thickness that is substantially greater than the thickness of the other of the inner member and the outer member.

In another beneficial aspect or embodiment of the invention, a structural member includes a body that has a variable length member.

In another beneficial aspect or embodiment of the invention, a structural member includes a body that has a telescoping member.

In another beneficial aspect or embodiment of the invention, a structural member includes a body having a band, at least a portion of which is helically wound into a tubular member, the band having a plurality of protrusions and a plurality of recesses along its length, the plurality of protrusions configured to engage with or disengage from the plurality of recesses as the band is helically wound or unwound, respectively, providing a variable length.

In another beneficial aspect or embodiment of the invention, a structural truss system includes a plurality of structural members in accordance with any of the preceding beneficial aspects or embodiments.

In another beneficial aspect or embodiment of the invention, a toy construction set includes a plurality of structural members in accordance with any of the preceding beneficial aspects or embodiments.

In another beneficial aspect or embodiment of the invention, a self-deploying, self-reconfigurable truss system includes a plurality of structural members in accordance with any of the preceding beneficial aspects or embodiments.

In another beneficial aspect or embodiment of the invention, a robotic apparatus includes a plurality of structural members in accordance with any of the preceding beneficial aspects or embodiments.

In another beneficial aspect or embodiment of the invention, a structural truss system includes a plurality of structural members in accordance with any of the preceding beneficial aspects or embodiments, wherein two or more of the structural members are connected at a node, the two or more structural members connected at the node having axes of rotation that intersect at a single point X.

In another beneficial aspect or embodiment of the invention, a joint attachment system for a reconfigurable truss includes a first joint attachment for pivotally attaching a first body member of the truss to a second body member of the truss, the first joint attachment having a first pivot axis. The joint attachment system also include a second joint attachment for pivotally attaching the second body member of the truss to a third body member of the truss, the second joint attachment having a second pivot axis. The first joint attachment and the second joint attachment form a concentric spherical joint linkage when attached to the first body member and the second body member respectively, wherein the first pivot axis of the first joint attachment intersects the second pivot axis of the second joint attachment at a single point X which defines a center of the concentric spherical joint linkage The concentric spherical joint linkage can be configured to allow the addition of one or more joint attachments and body members to the truss. The concentric spherical joint linkage is further configured to allow the removal of one or more joint attachments and body members from the truss.

In another beneficial aspect or embodiment of the invention, a joint attachment system includes a first joint attachment and a second joint attachment, each joint attachment having two revolute joints.

In another beneficial aspect or embodiment of the invention, a joint attachment system includes a first joint attachment and a second joint attachment, each joint attachment including one revolute joint and one prismatic joint.

In another beneficial aspect or embodiment of the invention, a joint attachment system includes a first joint attachment and a second joint attachment, each joint attachment including one revolute joint and one prismatic joint, wherein the prismatic joint is an arc-prismatic joint.

In another beneficial aspect or embodiment of the invention, a joint attachment system includes a first joint attachment and a second joint attachment, each joint attachment including one revolute joint and a locking chain.

In another beneficial aspect or embodiment of the invention, a joint attachment system includes a concentric spherical joint linkage configured to allow the addition of, and the removal of, one or more joint attachments and body members from the truss in a manual or automated process.

BRIEF DESCRIPTION OF THE DRAWINGS

The foregoing summary and the following description will be better understood in conjunction with the drawing figures which contain non-limiting examples, of which:

FIGS. 23A-23I provide perspective views of links for forming a locking chain in accordance with another embodiment of the invention;

DETAILED DESCRIPTION

Figure 1:
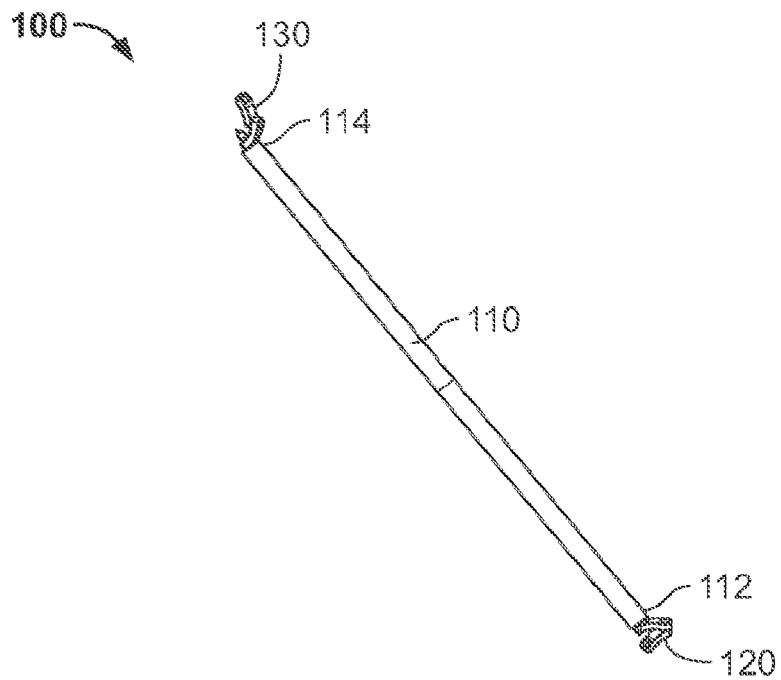
FIG. 1 is a perspective view of a structural member in accordance with one embodiment of the invention, shown in an expanded state.

In one beneficial aspect or alternative of the present invention, a structural member includes a body member comprising a first end and a second end. The first end includes a first joint attachment, and the second end includes a second joint attachment.

In another beneficial aspect or alternative of the present invention, the first joint attachment and the second joint attachment each comprise a first segment pivotally coupled to a second segment.

In another beneficial aspect or alternative of the present invention, the first segment is a first arcuate segment, and the second segment is a second arcuate segment.

In another beneficial aspect or alternative of the present invention, the first arcuate segment is a first arcuate link, and the second arcuate segment is a second arcuate link.

In another beneficial aspect or alternative of the present invention, each first segment has a first radius of curvature and each second segment has a second radius of curvature that is greater than the first radius of curvature.

In another beneficial aspect or alternative of the present invention, the first segment and the second segment each comprise a base end and a free end, and wherein the base end of the first segment is pivotally coupled to the base end of the second segment.

In another beneficial aspect or alternative of the present invention, the free end of the first segment comprises a first connector and the free end of the second segment comprises a second connector, the second connector adapted to connect with a first connector associated with another structural member.

In another beneficial aspect or alternative of the present invention, the first connector comprises one of a male connector and a female connector, and the second connector comprises the other of a male connector and a female connector.

In another beneficial aspect or alternative of the present invention, the male connector comprises a plug and the female connector comprises a socket.

In another beneficial aspect or alternative of the present invention, the plug comprises a cone-shaped extension and the socket comprises a circular aperture.

In another beneficial aspect or alternative of the present invention, the plug comprises a reduced diameter section forming a groove adapted to engage the female connector in a latched condition.

In another beneficial aspect or alternative of the present invention, the first connector and the second connector are genderless connectors.

In another beneficial aspect or alternative of the present invention, the second connector is adapted to connect with a first connector associated with another structural member by magnetic or electrostatic forces.

In another beneficial aspect or alternative of the present invention, the second connector is adapted to connect with a first connector associated with another structural member by chemical bonds, an adhesive, van der Waals forces or a phase change material.

In another beneficial aspect or alternative of the present invention, the second connector is adapted to connect with a first connector associated with another structural member by a mechanical connection.

In another beneficial aspect or alternative of the present invention, the mechanical connection comprises a press fit connection.

In another beneficial aspect or alternative of the present invention, the mechanical connection comprises an interference fit.

In another beneficial aspect or alternative of the present invention, the second segment comprises an inner member and an outer member.

In another beneficial aspect or alternative of the present invention, the inner member is pivotally coupled to the first segment at a first pivotal coupling and the outer member is pivotally coupled to the first segment at a second pivotal coupling, the first pivotal coupling being offset from the second pivotal coupling along a length of the first segment.

In another beneficial aspect or alternative of the present invention, the inner member and the outer member each comprise a female connector that defines an aperture passing completely therethrough, the aperture of the inner member adapted to partially or complete align with the aperture of the outer member dependent on the orientation of the second segment relative to the first segment.

In another beneficial aspect or alternative of the present invention, the second segment is pivotable with respect to the first segment between an open condition, in which the apertures through the inner member and outer member are axially aligned with one another, and a closed condition, in which the apertures through the inner member and outer member are axially offset from one another.

In another beneficial aspect or alternative of the present invention, the second segment is positioned in the open condition when the base end of the second segment is oriented at a release angle $\Theta$ relative to the base end of the first segment.

In another beneficial aspect or alternative of the present invention, the release angle $\Theta$ is 180 degrees.

In another beneficial aspect or alternative of the present invention, the first and second segments span a curve of 90 degrees in the open condition.

In another beneficial aspect or alternative of the present invention, the first and second segments span a curve of 180 degrees in the open condition.

In another beneficial aspect or alternative of the present invention, the second segment is positioned in the closed condition when the base end of the second segment is oriented at an angle that is less than release angle $\Theta$ relative to the base end of the first segment, and when the base end of the second segment is oriented at an angle that is greater than release angle $\Theta$ relative to the base end of the first segment. In another beneficial aspect or alternative of the present invention, a spring biases the second segment toward the open condition.

In another beneficial aspect or alternative of the present invention, one of the inner member and outer member has a thickness that is substantially greater than the thickness of the other of the inner member and the outer member.

In another beneficial aspect or alternative of the present invention, the body comprises a variable length member.

In another beneficial aspect or alternative of the present invention, the body comprises a telescoping member.

In another beneficial aspect or alternative of the present invention, the body comprises a band, at least a portion of which is helically wound into a tubular member, the band having a plurality of protrusions and a plurality of recesses along its length, the plurality of protrusions configured to engage with or disengage from the plurality of recesses as the band is helically wound or unwound, respectively, providing a variable length.

In another beneficial aspect or alternative of the present invention, a structural truss system includes a plurality of structural members in accordance with any of the examples described herein.

In another beneficial aspect or alternative of the present invention, a toy construction set includes a plurality of structural members in accordance with any of the examples described herein.

In another beneficial aspect or alternative of the present invention, a self-deploying, self-reconfigurable truss system includes a plurality of structural members in accordance with any of the examples described herein.

In another beneficial aspect or alternative of the present invention, a robotic apparatus includes a plurality of structural members in accordance with any of the examples described herein.

The following sections describe non-limiting examples of structural members and systems in accordance with the invention.

EXAMPLES

Although the invention is illustrated and described herein with reference to specific embodiments, the invention is not intended to be limited to the details shown. Rather, various modifications may be made in the details within the scope and range of equivalents of the claims and without departing from the invention.

Figure 2:
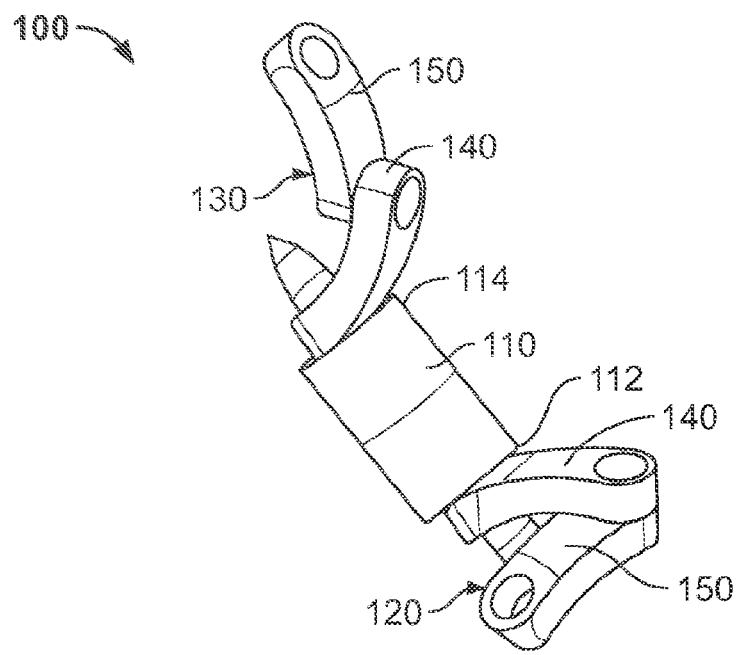
FIG. 2 is a perspective view of the structural member of FIG. 1, shown in a collapsed state.

Referring to the drawing figures generally, and FIGS. 1 and 2 in particular, a structural member 100, sometimes referred to herein as an "edge module", is shown in accordance with one embodiment. Structural member 100 can be a repeating unit or element of a larger structural system, and can be employed in various applications.

Structural member 100 includes a body member 110 comprising a first end 112 and a second end 114. The first end 112 includes a first joint attachment 120, and the second end 114 includes a second joint attachment 130. The first joint attachment 120 and the second joint attachment 130 each include a first segment 140 pivotally coupled to a second segment 150.

The segments can take various forms in accordance with the invention. For example, segments in accordance with the invention can be in the form of links. Links on different structural members can be connected in chains. The ends of the members have revolute joints, with each revolute joint having an axis. As each link pair is added to a chain, another revolute joint is added. All of the revolute joint axes intersect at the same point, forming a spherical linkage.

First and second segments 140, 150 are arcuate shaped links that can combine with other links on other members to form a spherical linkage. Links and other types of segments in accordance with the invention need not be arcuate or curved. Rather, the links can have any geometrical configuration that allow the links to be attached to one another to form a spherical linkage. Arcuate shaped segments and links mitigate certain issues, such as collision between adjoining segments, as will be explained. Body members in accordance with the invention can be adjustable in length.

Various types of adjustable or variable length body members can be used. For example, body member 110 is a telescoping member. In FIG. 1, body member 110 is expanded. In FIG. 2, body member 110 is collapsed. Expandable and collapsible body members in accordance with the invention allow the structural members and systems to be densely-packed or consolidated structures as needed, such as during transport, and subsequently be expanded.

Figure 3:
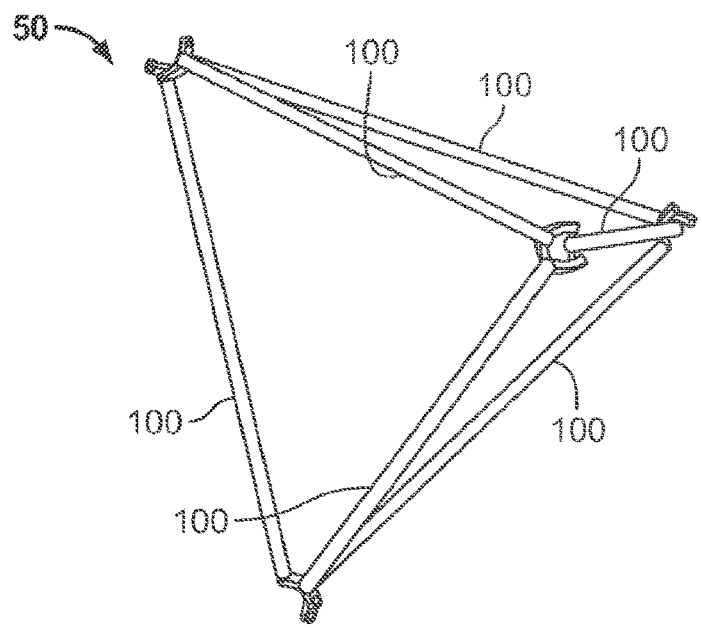
FIG. 3 is a perspective view of a structural system made up of structural members in accordance another embodiment of the invention.

Structural members in accordance with the invention can be joined end to end to form various structures. FIG. 3 shows six structural members 100 attached together to form a tetrahedron. The structural members 100 are joined to one another at their respective joint attachments, or node attachments. Because the structural members 100 are joined at these nodes which are the spherical linkages described above, they constrain only the position of the ends of the members not the angles they form. Therefore, no moments may be transmitted between members, only forces. Assuming only repeated identical edge modules, and no specialized elements (e.g. a base structure or end effector), six edge modules can join at four nodes to form of a tetrahedron. Each member can change its length thus allowing the arbitrary positioning (x,y,z) of any node relative to another node. For example, if one face of the tetrahedron is fixed (i.e. three fixed members), then the other three free members have three degrees of freedom to position the one free node in Cartesian space.

If manipulation of position and orientation are required, a six degree of freedom Stewart Gough platform can be formed out of twelve edge modules with three forming a fixed base, three forming a fixed output stage and six forming the prismatic joints of the Stewart platform. Note the base and output stage could be specialized structures (not edge modules) that have three node attachments each reducing the requirement to six edge modules. Thus, a tetrahedron of edge modules with these docking ends can be considered as a robot arm that manipulates other edge modules in place to dock or undock with other edge modules to form or reconfigure larger truss systems. Any tetrahedron subassembly in a larger truss system can similarly be used in this fashion.

As an alternative to telescoping members, the body member can also be in the form of a helically wound band, an example of which is shown and described in International Application No. PCT/US2015/012609, published as International Pub. No. WO 2015/112815, the contents of the application and publication being incorporated by reference in their entirety and for all purposes. At least a portion of the band can be helically wound into a tubular member. The band has a plurality of protrusions and a plurality of recesses along its length. The plurality of protrusions are configured to engage with or disengage from the plurality of recesses as the band is helically wound or unwound, respectively, providing a variable length. Tubular members of this type provide a high strength to weight ratio, and are suitable for many applications.

Figure 4:
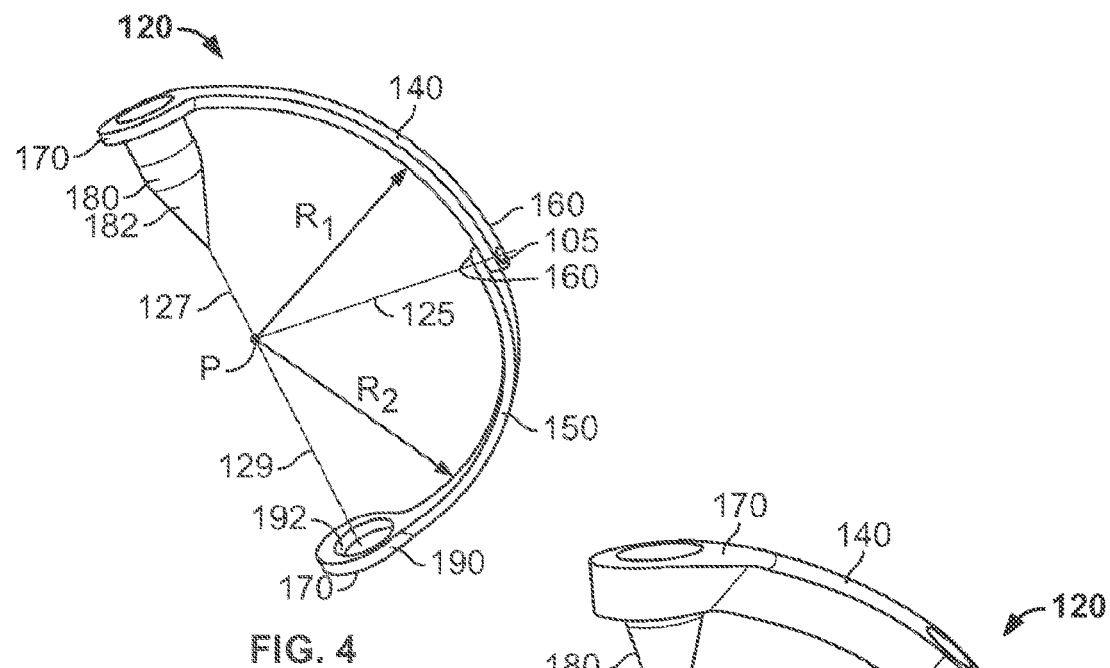
FIG. 4 is a perspective view of a joint attachment portion of a structural member in accordance with another embodiment of the invention.
Figure 5:
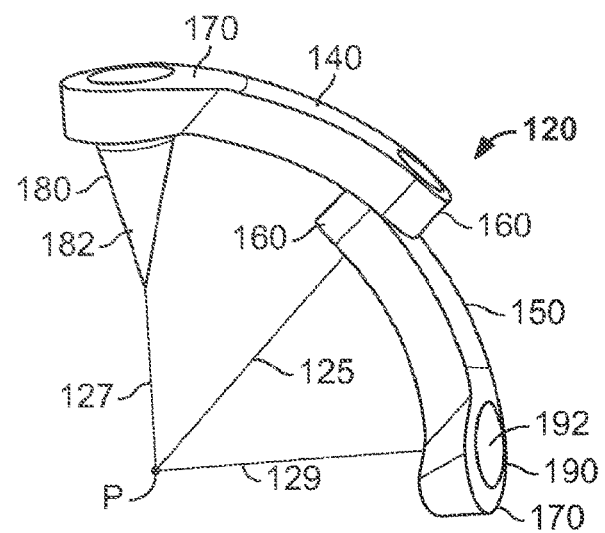
FIG. 5 is a perspective view of a joint attachment portion of a structural member in accordance with another embodiment of the invention.

Joint attachments 120 and 130 have a 2-link construct. The geometry in this case for both segments are such that the first and second pivot axis intersect and form a 90 degree angle. When the segments or links are pivoted so that the segments are arranged in a "C" shape, i.e. in the same plane, the segments are said to be separated by 180 degrees. In this orientation, the segments span an arc length. The arc length can vary, depending on the chosen arc length of each segment. FIG. 4 shows an example where the segments span 180 degrees. FIG. 5 shows an example where the segments span 90 degrees.

Figure 6:
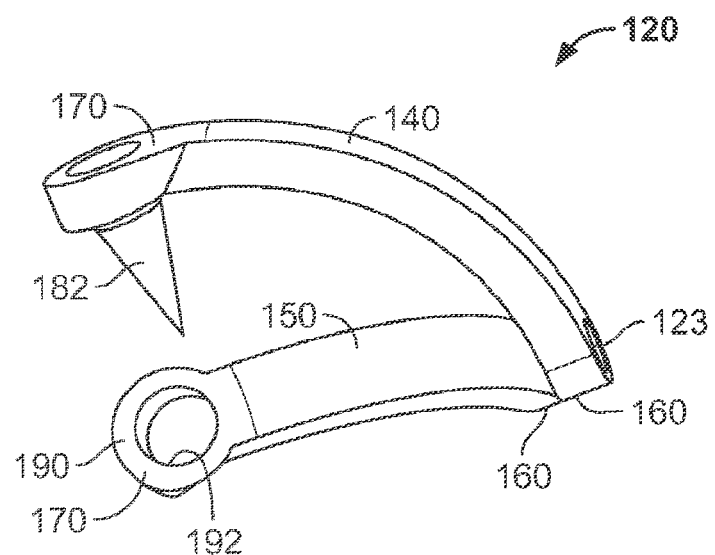
FIG. 6 is a perspective view of a joint attachment portion of a structural member in accordance with another embodiment of the invention.
Figure 7:
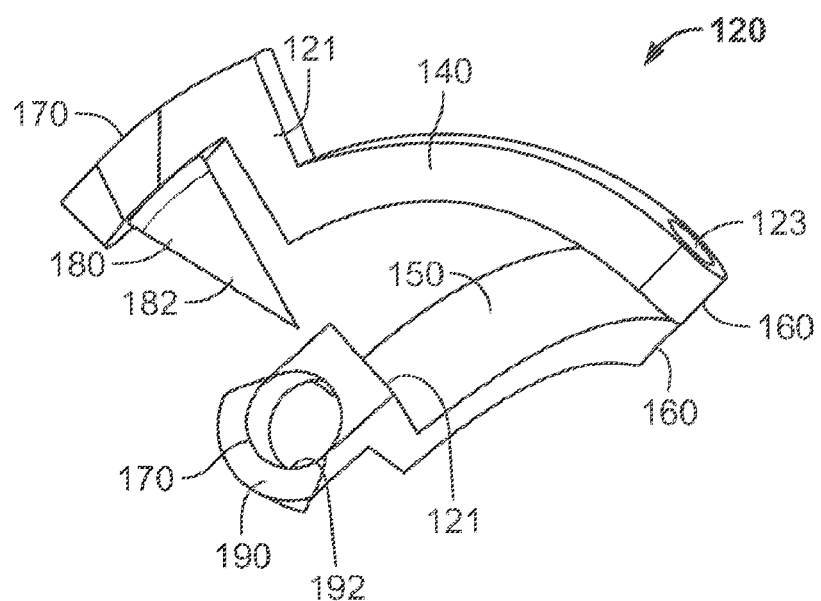
FIG. 7 is a perspective view of a joint attachment portion of a structural member in accordance with another embodiment of the invention.
Figure 8:
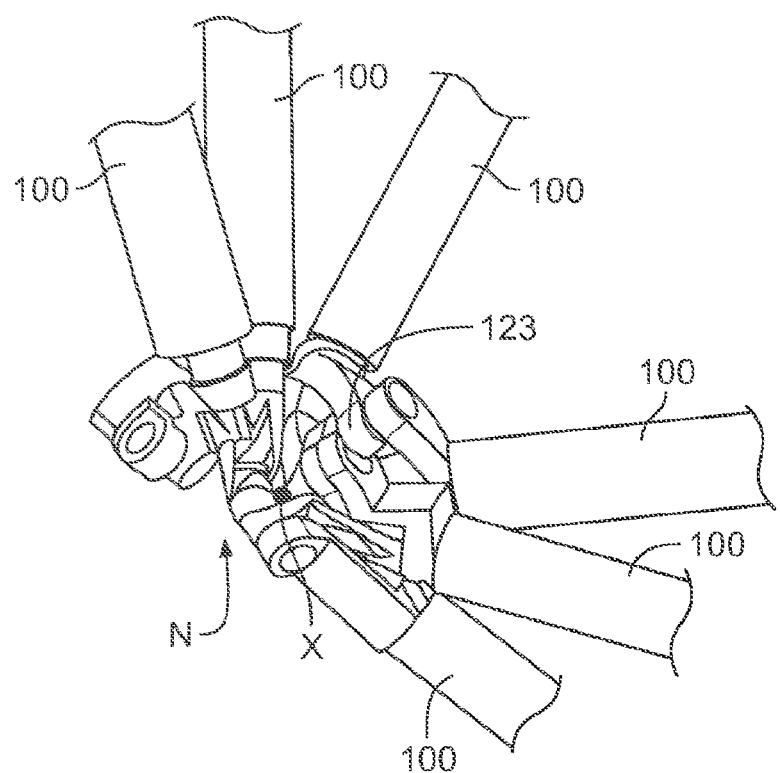
FIG. 8 is a perspective view of a plurality of structural members in accordance with another embodiment of the invention, the view being enlarged and partially truncated to show joint attachment portions interconnected with one another.
Figure 9:
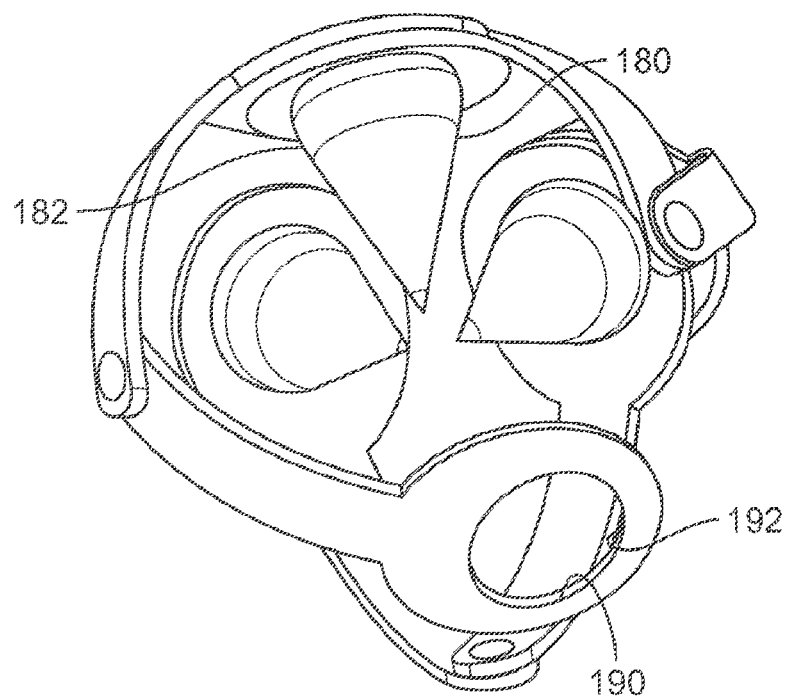
FIG. 9 is a perspective view of a plurality of interconnected joint attachment portions of structural members in accordance with another embodiment of the invention.

Each first segment 140 has a first radius of curvature $R_1$ and each second segment 150 has a second radius of curvature $R_2$. The first radius of curvature $R_1$ can be substantially equal to the second radius of curvature $R_2$. The first and second segments 140, 150 can have a reduced radius of curvature compared to other structural members to avoid collision with other structural members. This allows the "elbows" of adjoined structural members (i.e. the pivot couplings at which the links are connected) to pivot without colliding with one another. FIG. 6 shows one example of 2-link joint attachment 120. FIG. 7 shows an example of an alternate 2-link joint attachment 120 in which the links 140, 150 each have an offset or "dog leg" 121 between their respective base ends and free ends. The section of each link between the base end 160 and the offset 121 has a reduced radius so that the links to do not collide with links of other joint attachments. FIG. 8 shows one example of how offsets can be used in a system. The system features six structural members 100 intersecting at one node N. The three structural members on the right side have joint attachments with three different radii of curvature and different degrees of offset to alleviate collisions between elbows 123 of the members. The spherical links of the six structural members 100 each have an axis of rotation which intersects at point X.

It is important to note that systems in accordance with the invention can feature various types and configurations of joint attachments that make up a spherical linkage. Therefore, systems in accordance with the invention do not need to have 2-link joint attachments, as shown for example in FIG. 8, to form the spherical linkage. As noted above, the axis of rotation of each joint attachment intersects at a single point to form the spherical linkage. This is in contrast to a normal planar linkage, in which the axes of rotation of each joint attachment intersects at infinity.

Referring to FIGS. 4-7, the first segment 140 and the second segment 150 each comprise a base end 160 and a free end 170. The base end 160 of the first segment 140 is pivotally coupled to the base end 160 of the second segment 150. The free end 170 of the first segment 140 comprises a first connector 180 and the free end 170 of the second segment 150 comprises a second connector 190. The second connector 190 is adapted to connect with a first connector associated with another structural member. As such, a joint attachment 120 of a first structural member can be attached to a joint attachment 120 of a second structural member, the joint attachment 120 of the second structural member can be attached to a joint attachment 120 of a third structural member, and so on, to form a chain of links that make up one node of a truss. A new joint having a joint axis is formed each time that a joint attachment of one structural member is attached to joint attachment of another structural member. The joint axes of all of the joints that make up a node intersect at a point.

Referring to FIGS. 4 and 5, the intersection of joint axes formed between adjoining joint attachments can be visualized. The first and second segments 140, 150 of joint attachment 120 pivot about a joint axis 125. When first connector 180 is attached to a second connector of another joint attachment (not shown), that forms a second joint with a second joint axis 127. Likewise, when second connector 190 is attached to a first connector of yet another joint attachment (not shown), that forms a third joint with a third joint axis 129. First, second and third joint axes 125, 127 and 129 all intersect at point P. As joint attachments for additional structural members are connected to the chain, additional joints are formed, and the axes of those additional joints will also intersect at point P. Thus, an arbitrary number of joint attachments 120 can be connected in a chain to make one node of a truss, with all of the joint axes intersecting at one point.

Various types of connectors can be used in accordance with the invention. The first connector can be one of a male connector and a female connector, and the second connector can be the other of a male connector and a female connector. For example, the male connector can be in the form of a plug and the female connector comprises a socket. Referring to FIGS. 4-11, first segment 140 has a plug 180 in the form of a cone-shaped extension 182. Second segment 150 has a socket 190 in the form of a circular aperture 192.

The first connector and second connector need not be male and female connectors. It will be understood that various types of connectors can be used, including but not limited to gendered and genderless or "hermaphroditic" connectors. In addition, various types of mechanical connections can be used, including but not limited to a press fit connection or an interference fit or latching and hook type connectors. Alternatively, the structural members in accordance with the invention can interconnect with one another using other connection means, including but not limited to mechanical fasteners (either integrated with the members or separate), magnetic forces, electrostatic forces, chemical bonds, adhesive, van der Waals forces, and/or phase change materials.

Figure 10:
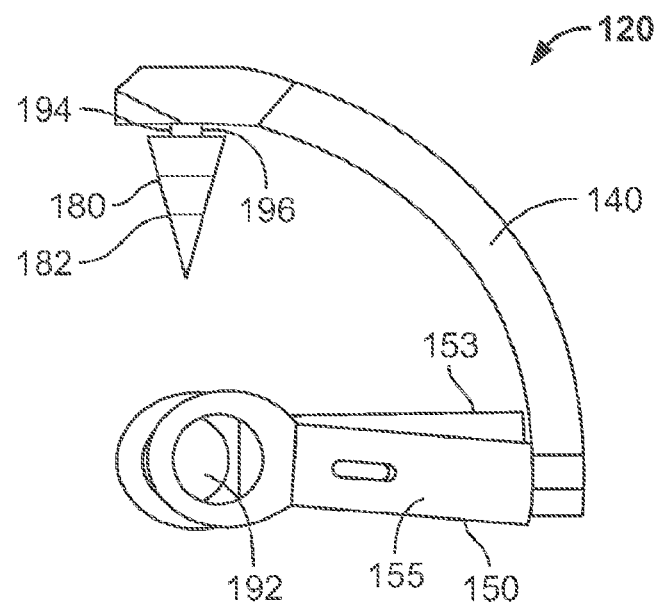
FIG. 10 is a perspective view of a joint attachment portion of a structural member in accordance with another embodiment of the invention.
Figure 11:
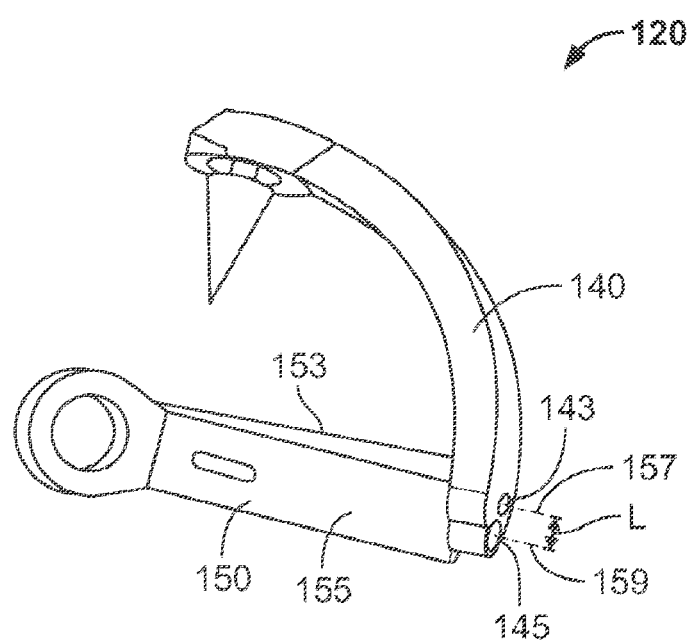
FIG. 11 is another perspective view of the joint attachment portion of FIG. 10, shown in a closed condition.
Figure 12:
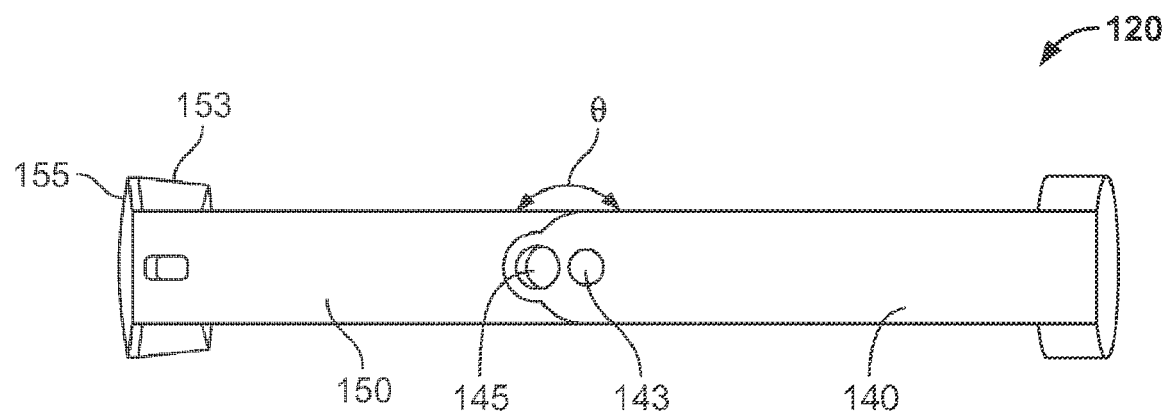
FIG. 12 is an end view of the joint attachment portion of FIG. 10, shown in an open condition.

Referring to the example in FIGS. 10 and 11, plug 190 includes a reduced diameter section 194 forming a groove 196 adapted to engage aperture 192 in a latched condition. In addition, the second segment 150 comprises two separate members that shift with respect to one another to provide a latching mechanism. In particular, second segment 150 comprises an inner member 153 and an outer member 155. Inner member 153 is pivotally coupled to the first segment 140 at a first pivotal coupling 143 and the outer member 155 is pivotally coupled to the first segment at a second pivotal coupling 145. First pivotal coupling 143 is offset from the second pivotal coupling 145 along a length L of the first segment 140. As such, inner member 153 has a first pivot axis 157 and outer member 155 has a second pivot axis 159 offset from the first pivot axis. Inner and outer members in accordance with the invention can have different thicknesses and/or possess different physical properties. Referring to FIG. 12, outer member 155 is a thin band or ribbon-like element with a much smaller thickness than inner member 153.

Figure 13:
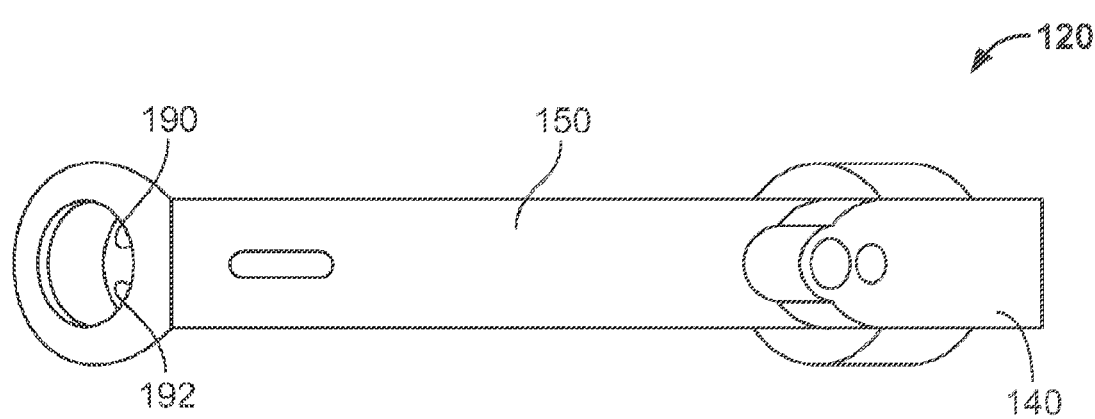
FIG. 13 is another perspective view of the joint attachment portion of FIG. 10, also showing the structural member in the open condition.

Inner member 153 and outer member 155 each comprise a female connector 190 that defines an aperture 192 passing completely therethrough, the aperture of the inner member adapted to partially or complete align with the aperture of the outer member dependent on the orientation of the second segment relative to the first segment. The second segment 150 is pivotable with respect to the first segment 140 between an open condition and a closed condition. In the open condition, the inner member 153 and outer member 155 are pivoted with respect to first segment so that the apertures through the inner member and outer member are axially aligned with one another. In the closed condition, which can be brought about by any number of positions, the apertures through the inner member and outer member are axially offset from one another. The second segment is positioned in the open condition when the base end of the second segment is oriented at a certain angle, called the "release angle $\Theta$", relative to the base end of the first segment. The release angle $\Theta$ can be 180 degrees, as shown for example in FIGS. 12 and 13. When the angle between the first and second segments 140, 150 is either less than 180 degrees, or greater than 180 degrees, the second segment is in the closed condition. For example, FIGS. 10 and 11 show arrangements where the second segment is in the closed condition, i.e. the apertures 192 are axially misaligned, which results in a smaller area of overlap between the apertures, forming a constriction that causes the female connector to latch onto a male connector of another structural member.

In certain embodiments, it may be desirable to bias the structural member toward the open condition. Referring to FIG. 4, for example, structural member 100 includes an internal spring 105 between the two segments that biases the second segment toward the open condition.

Spherical links in accordance with the invention can have one degree of freedom revolute joints at both ends of the link whose axis of rotation all intersect at one point. A spherical chain can be comprised of spherical links all of whose axis of rotation intersect at one point. As a result, the motion of a chain of links revolve around that intersection point each at a constant radius away. Two edge modules attached together with a two link spherical linkage have similar kinematics as two edge modules attached together with a universal joint. If axial rotation is allowed at the edges attachment to the spherical link, it is kinematically similar to a spherical joint.

The ends of the edge modules can be created with a two spherical link chain. As described previously, the first link of the chain can have some form of joining mechanism, like a male connector (e.g. pin, plug, north polarized magnet, or positively charged ions). The second link can have a mating mechanism like a female connector (e.g. aperture, south polarized magnet or negatively charged ions). Two edge modules can be joined by mating one polarization on one with the mating polarization on another. Some form of latch can be activated to hold the connection in place, and deactivated to unlatch and undock modules. Each edge module adds two links into the chain, adding for example, one open male and one open female connector, and consuming one male and one female connector that are mated. Thus, no matter how long the chain is, there is always one free male connector and one free female connector at the other end allowing the addition of more links.

There are several issues with the implementation of spherical links as nodes. These include: 1) possible collisions between links as the angles change, 2) compliance/imprecision in the joint and bending of spherical links, and 3) range of angular motion (if not the full spherical coverage). There are several options to alleviate possible collision of the links. One is to reduce the link span (resulting in reduced range of angular motion). The largest required link spanning angle between axis is 90 degrees. That is, with a link span of 90 degrees, the free ends of the segments can reach any point on the surface of a sphere—larger spans would not improve the range of motion. However, smaller spans reduce the probability of collisions with other links that may be shared at a node. When edge modules change angles, the elbows may collide with other elbows.

One mitigation is to have the links sweep out different spherical radii. While it is required that all joint axis intersect at a point to maintain the spherical joint constraint, the linkages do not need to occupy the same radius from that intersection point. The embodiments in FIGS. 7 and 8 show examples of joint attachments with offsets 121 and different radii that mitigate the problem of collision between elbows.

The issue of compliance of links can be compensated for by having thicker links. For example, the links in FIG. 5 are substantially thicker than those of FIG. 4. An increased thickness increases the stiffness of the links and eases the manufacture of higher precision joint interfaces capable of withstanding larger torques and moments with less deflection. When making link spans less than 90 degrees, there will be a restriction on the attainable truss geometry—the angles between adjacent edges must be less than two times the span angle. However, since each node contains a chain of edges, this constraint only applies to adjacent links in the chain, (i.e. if there is a chain of 3 edge modules at a node with link spans of 45 degrees (as in FIG. 5), and they have ordered label edges A, B, C, then the angle between edges A and B<90, and the angle between B and C<90, however, the angle between A and C can be up to 180.)

The shape change of a truss can be achieved on many levels. The geometry can change by changing the link lengths (as with VGTs). The node connectivity (truss topology) can be manually rearranged. The node connectivity can also be automatically rearranged (self-reconfigured). For self-reconfiguration, the edge-ends must dock and undock with other edge-ends. The docking process can involve the following four steps:

1) Mating ends approach along an approach direction.
2) Mating ends make contact such that further motions occur with sliding contact.
3) Mating ends reach the docked position
4) Mating ends are latched (e.g. a mechanical interference lock)

These steps may be the only steps, or combined with additional steps.

In the previous examples, the edge-ends have one end with a cone and one end with a hole. Docking in this design occurs by having the cone enter the hole until the ring forming the hole becomes flush with the top of the cone where it is latched. To allow for more imprecision in control, the geometry of the ends can be changed for example making the cone and holes larger.

A latch mechanism can be achieved with a mechanical structure that is inserted to interfere with motions releasing the dock. As noted in the example shown in FIGS. 10-13, a latch can be provided by having a third spherical link attached in parallel to the second spherical link. The rotational axis of the third spherical link is offset but in close proximity to the rotational axis of the second spherical link. The third link can be very thin (e.g. a metal ribbon) and made to engage a groove feature in the plug or cone to capture it in the docked position. This third spherical link can be made to rotate with the second spherical linkage, for example with a peg in a slot between the second and third link. The offset between the rotational axes of the second and third links causes the free end of the third link to shift on the surface of the virtual sphere. This shift can be used to engage a mechanical lock. The spherical link ends have two rotational degrees of freedom that allow one end to reach anywhere on the surface of a virtual sphere. Having a fixed location of this end relative to the other end can make the docking process easier as the mating end would not have to search for unconstrained position of the end. If the two links each span 90 degrees, and the elbow joint had a spring induced bias to remain straightened (e.g. 180 degrees), then the ends of the links would nominally sit 180 (polar opposite) from each other. When linking trusses together, this would be the condition where two edges are co-linear. The second degree of freedom in the node can be ignored at this point as that degree of freedom can rotate without changing the relative position of the ends. Note that in an assembled truss this condition is rare for a 2 degree node as the two members and node could be replaced with a single longer truss member.

We can use this condition to be the open condition or "(dis)assembly" condition. That is, edge modules can be attached or detached if and only if the elbow is in the open condition, e.g., when the two links are separated by 180 degrees. At all other times, a latch is engaged by the rotation of the elbow outside of 180. When the elbow is at 180, the two apertures or holes are aligned and so the cone or plug is free to be inserted or removed from the apertures. When outside of 180 degrees, the holes in the two links are no longer aligned, causing the latching structure to engage into the slot in the mating plug or cone, capturing it the apertures.

Another way to view this is in the manual assembly of two structural members. A user would take one structural member and align it with another structural member so that the two members are collinear. The plug or cone of one end should align with the hole of the mating truss. Since mating hole is open, the spring bias will keep the elbow at 180 degrees and the hole will be open to receive the plug or cone. Once docked, the user can bend the two trusses such that they are no longer collinear. This action will cause the elbow to bend and the third link to become offset, engaging it into the plug's groove, capturing the plug so it cannot be released from the apertures.

Applications include deployable truss structures, including but not limited to human scale trusses used for stage platforms, lighting structures, and backdrops. Applications also include trusses deployed in space. Moreover, structural members in accordance with the invention can be applied in educational contexts, including but not limited to building models of bridges, towers, crystal lattices, and other modeled structures. Furthermore, structural members in accordance with the invention can be used in robotic applications, including self-reconfigurable apparatuses and systems. Lastly, structural members in accordance with the invention can be used in the toy and recreation industry, including but not limited to toy construction sets and indoor or outdoor play sets.

Figure 14:
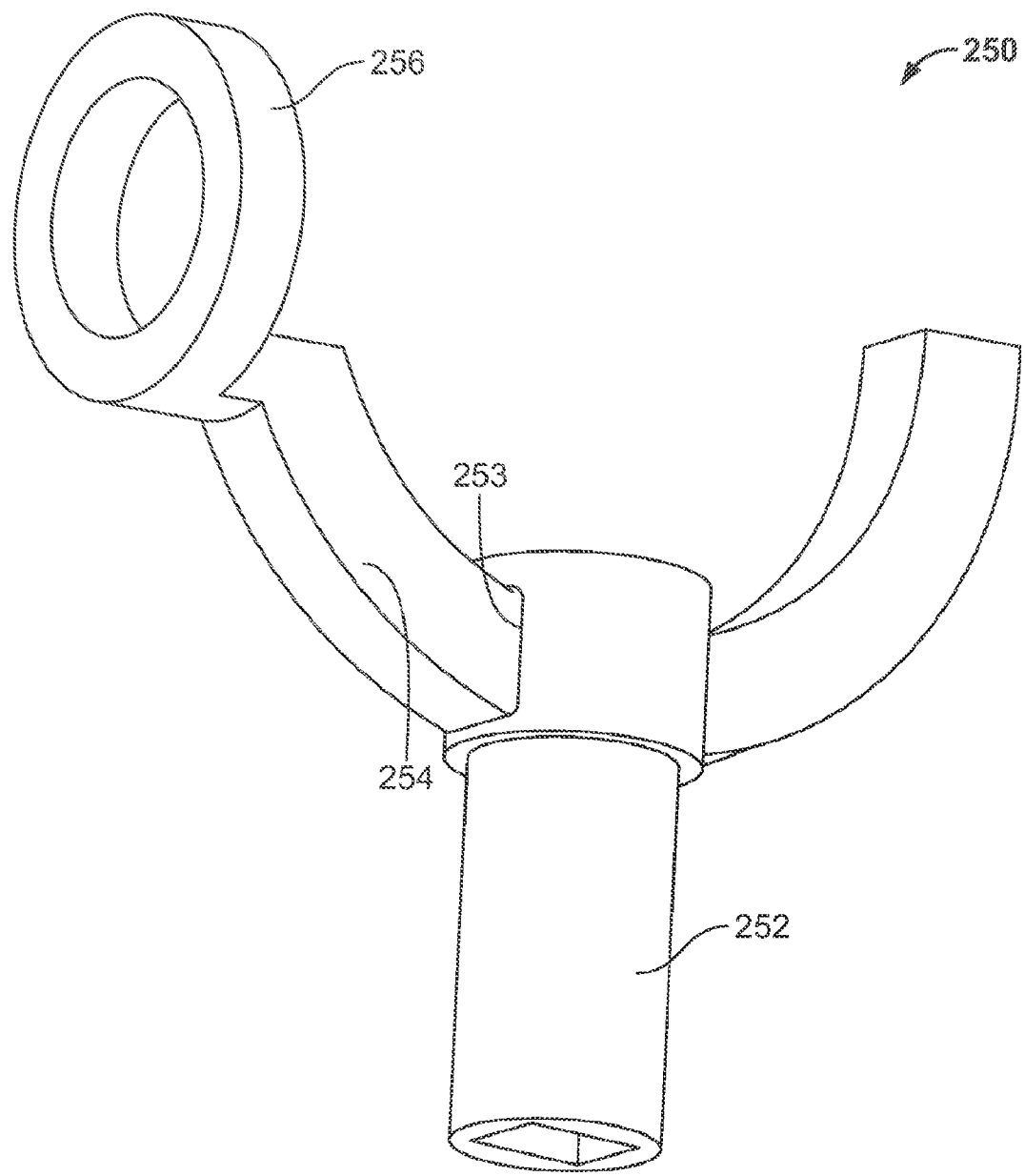
FIG. 14 is a perspective view of a joint attachment portion of a structural member in accordance with another embodiment of the invention.

Referring now to FIG. 14, an alternate joint attachment 250 for a reconfigurable truss is shown which maintains the constraint that the pivot axis of the members intersect at one point. Joint attachment 250 can be utilized with additional identical joint attachments and body members to form the same reconfigurable truss 50 shown in FIG. 3. In such a truss, the previously described joint attachments 120 and 130 are replaced with a joint attachment 250. As such, a joint attachment 250 is attached at each end of a body member 110 to form a truss member 100 which is combinable with similar truss members 100.

Each joint attachment 250 includes a first element in the form of a shaft 252 and a second element in the form of a rigid arc-shaped body 254. Shaft 252 defines a passage or opening 253 that receives arc-shaped body 254 to allow the arc-shaped body to move through the shaft in an arc-prismatic joint. The term "arc-prismatic joint", as used herein, means a joint that provides a translational movement between elements, wherein one element moves relative to another element along an arc-shaped path. This translational movement can be a sliding movement in which the passage 253 slidingly engages the exterior of arc-shaped body 254.

One end of arc-shaped body 254 includes a loop 256. Loop 256 is configured to receive a shaft of a second joint attachment identical to joint attachment 250. In such an arrangement, loop 256 forms one revolute joint with the shaft of the second joint attachment. In addition, the passage 253 in shaft 252 and arc-shaped body 254 form an arc-prismatic joint. Therefore, each joint attachment 250 provides one revolute joint and one arc-prismatic joint. This in contrast to the previously described joint attachment 120 which features two revolute joints.

As with the previously described joint attachments 120, joint attachment 250 allows truss members to be joined in an "open-ended" reconfigurable system. The term "open-ended", as used herein, means a truss system that permits the selective addition of truss members, as well as the selective subtraction of truss members. This ability to add and subtract truss members allows the truss to be adapted to different applications and modes of operation.

Figure 15:
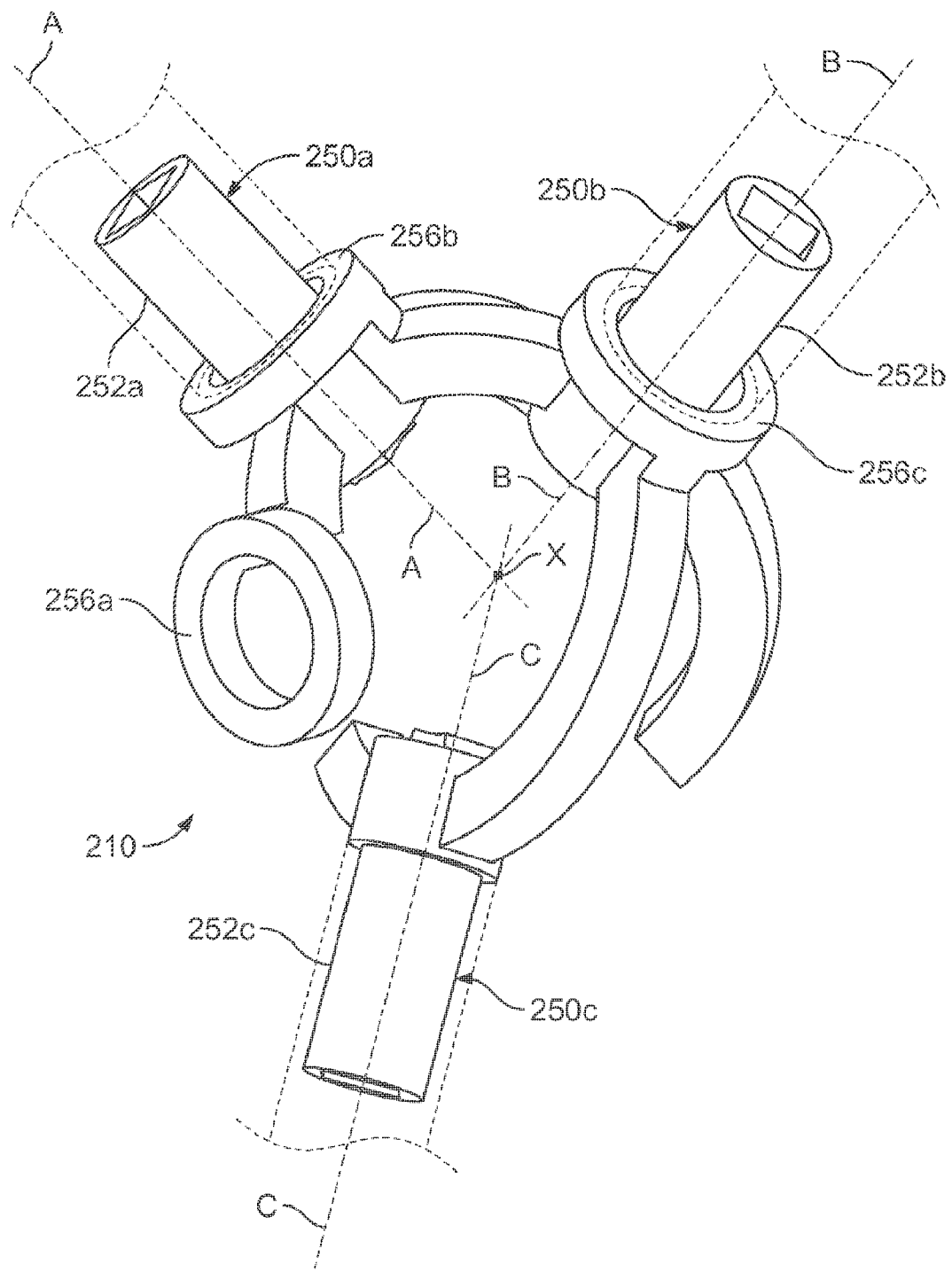
FIG. 15 is a perspective view of an assembly of three joint attachment portions of structural members in accordance with another embodiment of the invention.

FIG. 15 shows three joint attachments 250a, 250b, 250c assembled together to form a concentric spherical linkage 210. Joint attachments 250a, 250b, 250c have shafts 252a, 252b, 252c, respectively. Shafts 252a, 252b, 252c define pivot axes A, B and C, respectively. Pivot axes A, B and C intersect at central point X which defines the center of concentric spherical linkage 210.

Each of shafts 252a, 252b, 252c connects to a structural truss member. The shafts can be completely hollow to receive the structural truss members. Alternatively, the shafts can be axially inserted or received inside the truss members. In the example in FIG. 15, the shafts are shown inserted inside the truss members, and the truss members are shown in dashed line so as not to conceal the shaft from view. Various structural truss members can be connected to the shafts, including but not limited to structural members of the type shown in FIG. 3.

Shaft 252a of joint attachment 250a connects to a loop 256b of joint attachment 250b. Likewise, shaft 252b of joint attachment 250b connects to a loop 256c of joint attachment 250c. Loop 256a of joint attachment 250a is not attached to any element, allowing the optional connection to a fourth attachment joint (not shown). As such, concentric spherical linkage 210 is an open-ended linkage that allows the addition of more attachment joints, and consequently, more truss members to the linkage. Concentric spherical linkage 210 also allows the removal of one or more attachment joints to accommodate fewer truss members at the linkage.

Figure 16:
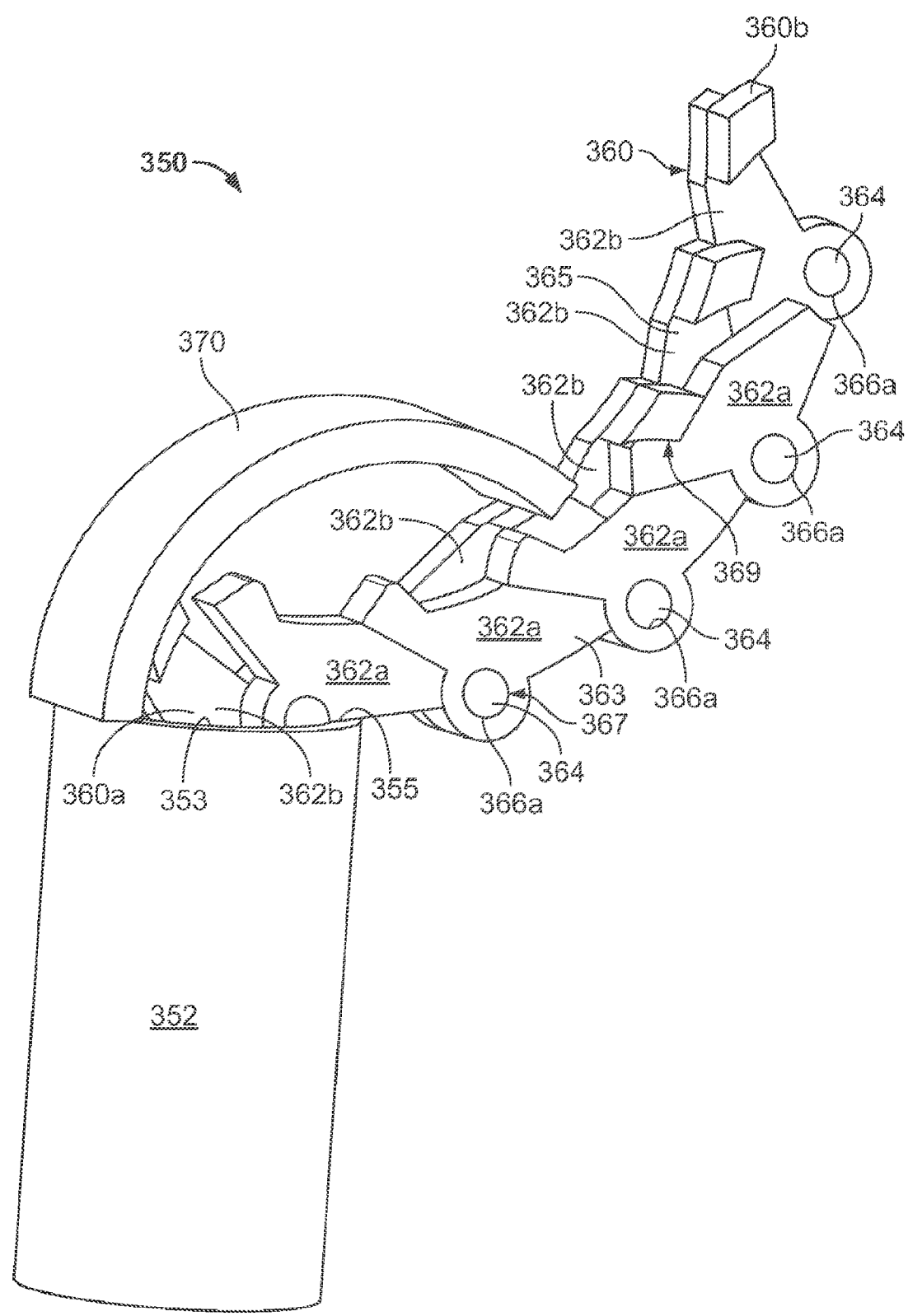
FIG. 16 is a truncated perspective view of a joint attachment portion of a structural member in accordance with another embodiment of the invention, with elements omitted for clarity.

Referring now to FIG. 16, another alternate joint attachment 350 for a reconfigurable truss is shown. As with the previously described joint attachments 120 and 250, joint attachment 350 allows truss members to be joined in an "open-ended" reconfigurable system. In addition, joint attachment 350 can be connected with other identical or similar joint attachments to form a concentric spherical joint linkage.

Figure 17:
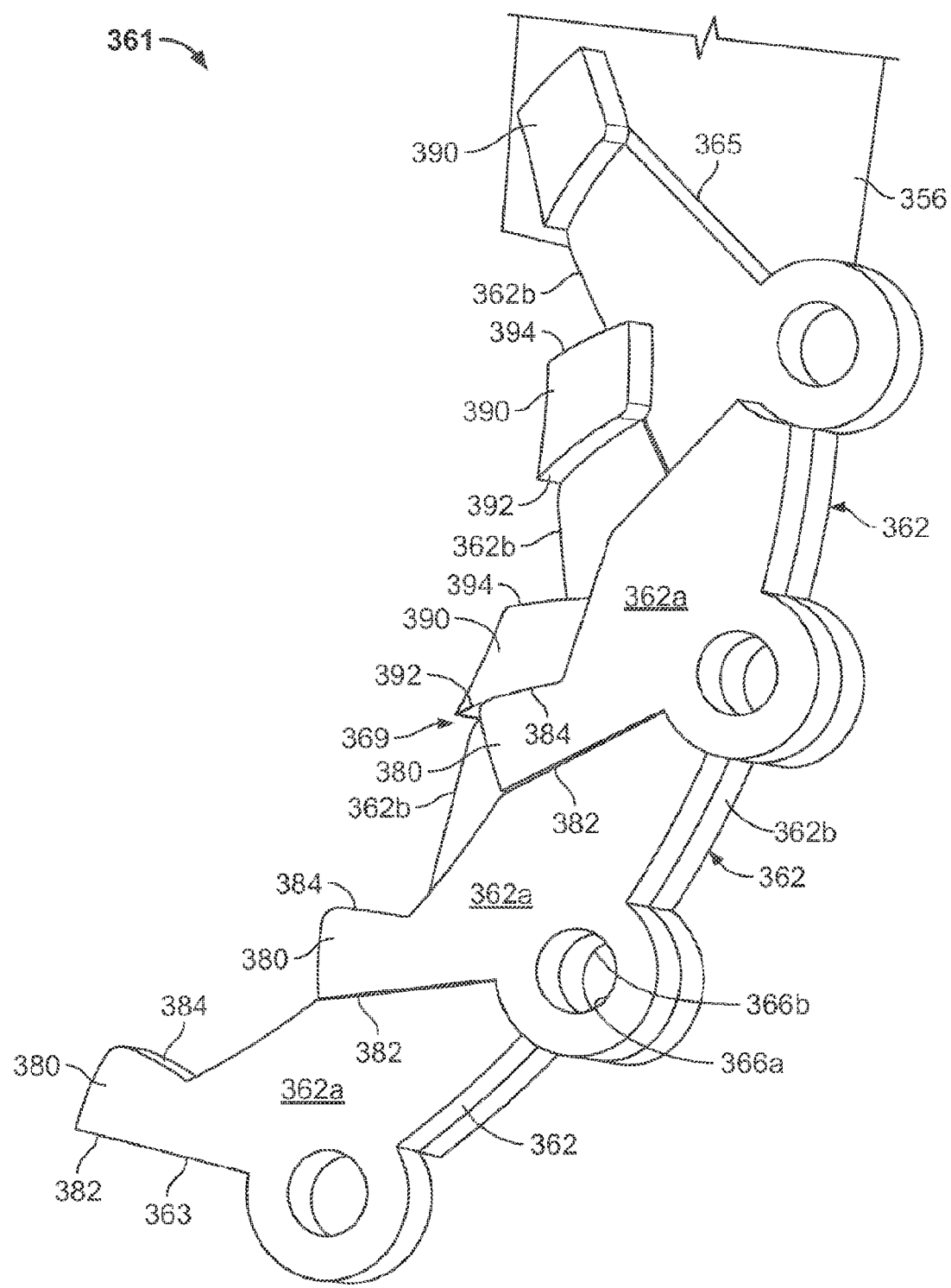
FIG. 17 is a truncated perspective view of components of a joint attachment portion in accordance with another embodiment of the invention, with other elements of the joint attachment portion omitted for clarity, the components shown in a locked state.

Joint attachment 350 can be identical in all aspects to joint attachment 250, except for the following differences. The rigid arc-shaped body of joint attachment 250 is replaced with a locking chain 360. The advantage of using a locking chain in place of a rigid arc-shaped body will be understood from the paragraphs that follow. Locking chain 360 has a first end 360a and a second end 360b. Moreover, locking chain 360 includes a plurality of links 362. Each link includes a first link portion 362a and a second link portion 362b integrally formed with the first link portion. The first link portions 362a collectively form a first side 363 of locking chain 360, and the second link portions 362b collectively form a second side 365 of the locking chain. Referring to FIG. 17, joint attachment 350 also includes a loop 356 (truncated for clarity) at second end 360b that is substantially similar or identical to loop 256 in the previous embodiment.

Joint attachment 350 further includes a shaft 352 that defines a passage or opening 353 to receive locking chain 360. Shaft 352 is configured to connect to a first structural member, which can either be inserted lengthwise and axially inside the shaft, or telescopically receive the shaft. The loop 356 attached to locking chain 360 is configured to attach around a shaft of another joint attachment 350 or a similar joint attachment. In this arrangement, joint attachment 350 can pivotally connect a first structural member to a second structural member using one revolute joint (at loop 356) and one locking chain.

Shaft 352 does not receive locking chain 360 in the same manner that shaft 252 receives arc-shaped body 254 in the previous embodiment. Instead of passing through shaft 352 in a manner forming an arc-prismatic joint, locking chain 360 enters opening 353 and then continues inside a hollow interior 355 of shaft 352. In this manner, locking chain 360 does not exit through the opposite side of shaft 352 after passing through the shaft, and therefore does not remain exposed after it passes through the shaft. The section of locking chain 360 that enters shaft 352 does not remain exposed outside the shaft, where it can potentially collide with other joint attachments or structural members at the concentric spherical joint. Although locking chain 360 is shown entering an opening in the end of shaft 352, the locking chain can also enter an opening in the side of the shaft in the same manner that arc-shaped body 254 enters through the side of shaft 252.

Referring now to FIG. 17, a section 361 of locking chain 360 is shown. Each link portion 362a includes a bore 366a that extends completely through the link portion and aligns with a bore 366b extending completely through an adjacent link portion 362b. Bores 366a and 366b receive a pivot pin 364 (shown in FIG. 16) that forms a pivotable connection. As such, adjacent link portions 362a and 362b share a pivot mechanism 367 that allows them to pivot with respect to one another. Pivot mechanism 367 includes the pivot pin 364 and the two aligned bores 366a and 366b.

Each link portion 362a also shares a locking mechanism 369 with a link portion 362b. Locking mechanism 369 can be engaged to lock the orientation of one link with respect to another link. Each link portion 362a shares its respective locking mechanism 369 with a link portion 362b. In this arrangement, each link 362 can be toggled between an unlocked condition, in which that link is free to pivot relative to an adjacent link, and a locked condition, in which the orientation of that link is fixed with respect to the adjacent link.

Links 362a and links 362b can only be unlocked and locked in a serial manner along the length of locking chain 360, analogous to interdigitating teeth of a zipper fastener that can be unlocked and locked in a serial manner. As a result, it is possible to start with all links 362a and 362b in a locked condition, and serially unlock each link one by one, starting from one end of the chain and proceeding along the length of the chain to a midsection of the chain. Unlocking of links can stop at any link along the locking chain 360. If the unlocking stops at the midsection of the locking chain 360, all links that are unlocked prior to the stopping point form an unlocked section of the chain that remains free to bend and articulate. The remaining links of locking chain 360 that are not unlocked form a locked section that remains in a rigid condition. Locked sections of locking chain 360 assume the shape of an arc. If all links are locked, then the entire locking chain 360 is rigidly held in the shape of an arc. If only a section of locking chain 360 is locked, then only that locked section is rigidly held in the shape of an arc, and the remaining unlocked section of the locking chain is free to articulate and assume various shapes.

Locking chain 360 is movable relative to shaft 352 to allow pivoting motion about a center point of the concentric spherical joint. As noted above, locking chain 360 passes into the hollow interior of shaft 352. Locking chain 360 can enter into shaft 352 and advance inside the shaft by unlocking the links 362a and 362b just prior to the links entering the shaft. For this purpose, joint attachment 350 includes an unlocking element or "slider" 370, which is shown in FIG. 16. Slider 370 is mounted to or otherwise positioned adjacent to shaft 352 in a position in proximity to opening 353. The slider serves the same purpose of a slider in a zipper. It maintains half of the zipper to be closed (maintains half of the arc to be rigid) and half to be open (half to be free). The tip of 370, feature 370a, holds the last rigid link in the chain in a manner that maintains the locking structure 390 of the last link locking the second to last and third to last links in place. The second to last locks the third to last and fourth to last in place etc. As the slider is moved along the free length of chain, slider 370 causes the last free link to rotate and lock the next link in the chain. If the slider is moved along the rigid length of the chain, the rotation of the last link occurs in the opposite direction unlocking each link.

Figure 18:
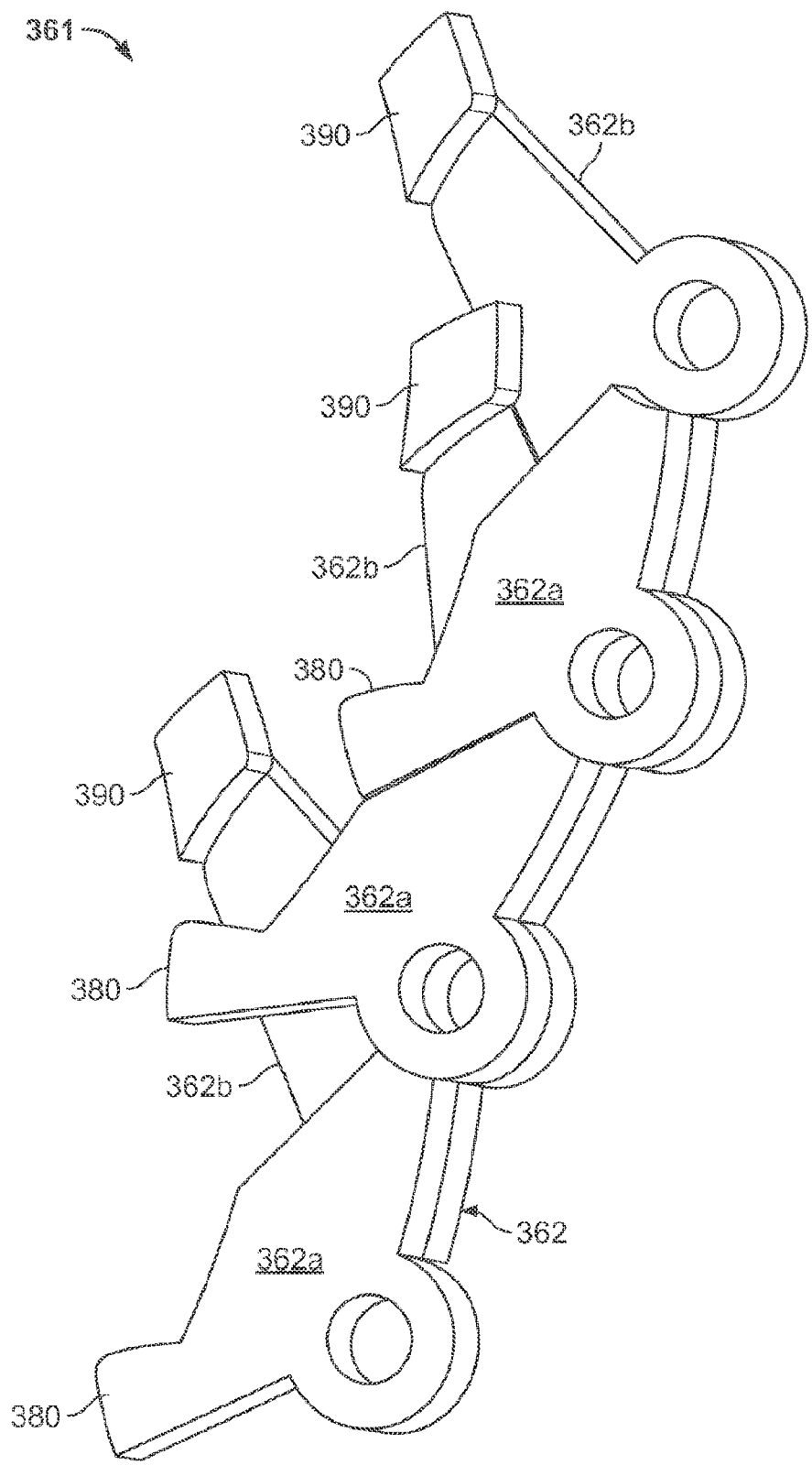
FIG. 18 is a truncated perspective view of the components of FIG. 17, with some components shown in a first unlocked arrangement.
Figure 19:
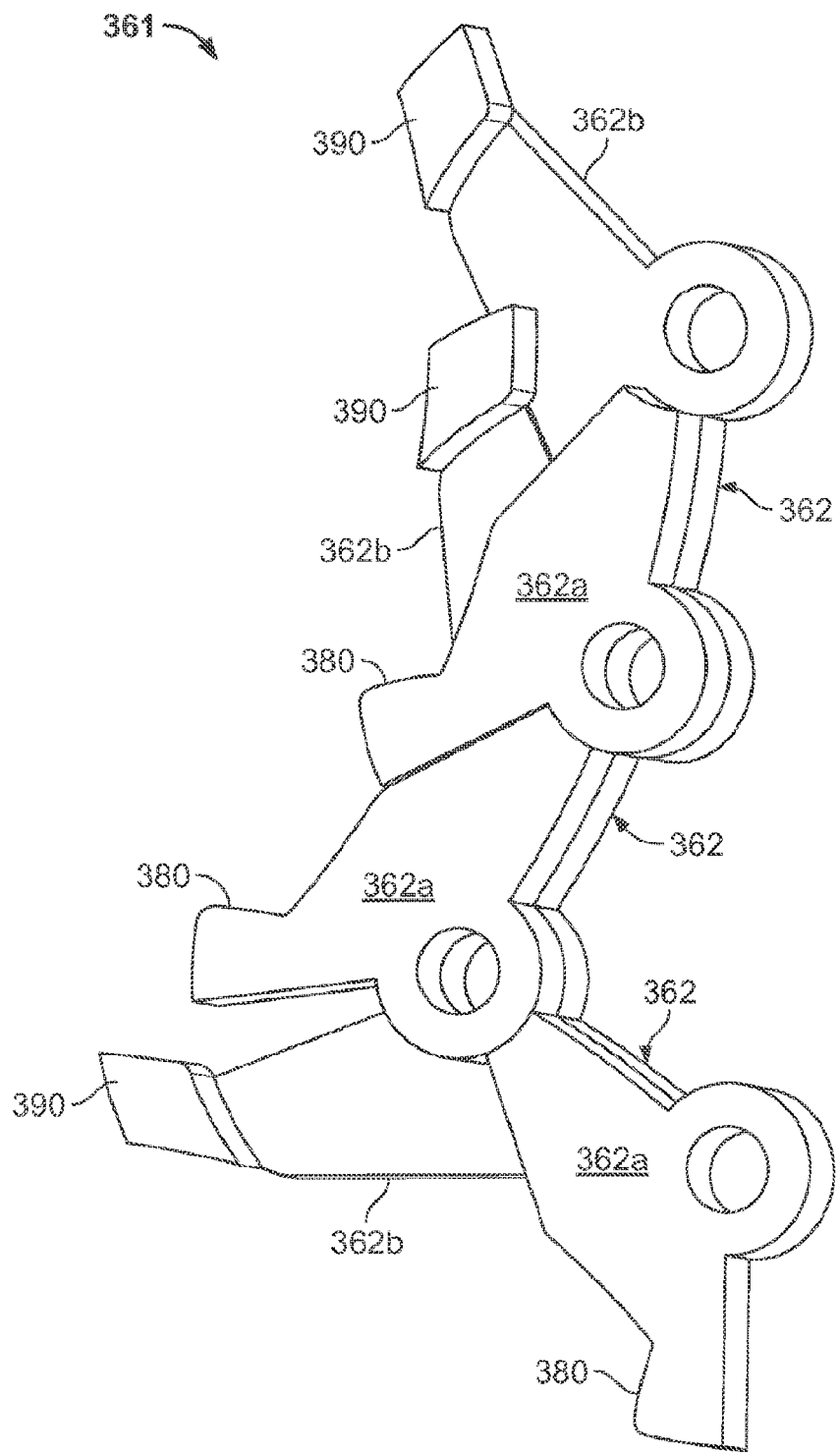
FIG. 19 is a truncated perspective view of the components of FIG. 17, with some components shown in a second unlocked arrangement.

FIGS. 17-19 illustrate the locking mechanisms 369 in locking chain 360 and how they operate in more detail. For purposes of illustration, FIGS. 17-19 only show a section 361 of a locking chain 360, omitting some of the links, as well as omitting the shaft 352, pins 366, slider 370 and loop. FIG. 17 represents the locking chain section 361 in a locked condition. To facilitate locking of the chain links, each link portion 362a includes a protruding portion or pivot stop 380. Pivot stop 380 extends within the same plane as the rest of link portion 362a. Each link portion 362b includes a projecting portion or pivot block 390 that is configured to slidingly engage and abut a pivot stop on one of the links 362a. Each pivot block 390 projects laterally or outside of the plane of the remainder of link portion 362b, and toward an adjacent link portion 362a as shown, such that the pivot block resides in the same plane as the plane of the pivot stop.

Each pivot stop 380 has a first edge 382 and a second edge 384 opposite the first edge. Similarly, each pivot block 390 has a first edge 392 and a second edge 394 opposite the first edge. Referring to the third link portion 362a in the series appearing in FIG. 17, it can be seen that the first edge 382 abuts an edge of the second link portion 362a in the series. At the same time, the second edge 384 abuts a first edge 392 of the adjacent pivot block 390. In such an arrangement, pivot stop 380 is trapped between the second link portion 362a and the pivot block 390 of the adjoining link 362b. This entrapment of the pivot stop locks the orientation of third link portion 362a relative to the second link portion 362a and adjoining link portion 362b. Although some of the link portions are omitted, it is to be understood that the other link portions 362a and 362b have identical pivot stops 380 and pivot blocks 390 that operate in an identical manner, such that all of the links are in the locked state in FIG. 17.

FIG. 18 shows the same locking chain section 361 with the first link 362 (the link on the left side of the Figure) in an unlocked state, and pivoted out of the arc-shaped profile of the remaining locked portion. In this state, the pivot block 390 of the first link 362 no longer engages or abuts a pivot stop 380 of the second link 362a, allowing the first link 362b to pivot out of the arc-shaped profile. FIG. 19 shows the same locking chain section 361 with the first link 362 pivoted further out of the arc-shaped profile. In this position, first link 362 can advance into the interior of the corresponding shaft 352, as shown in FIG. 16. Once advanced inside shaft 352, the unlocked section of the locking chain 360 remains stowed and out of the way of other joint attachments or structural members. This avoids potential collision with other joint attachments and structural members, offering more freedom of movement about the concentric spherical joint. By reducing the potential for collisions, locking chain 360 permits a greater number of joint attachments 350 to be added to the concentric spherical joint, providing greater ability to expand the truss at a single node.

Figure 20:
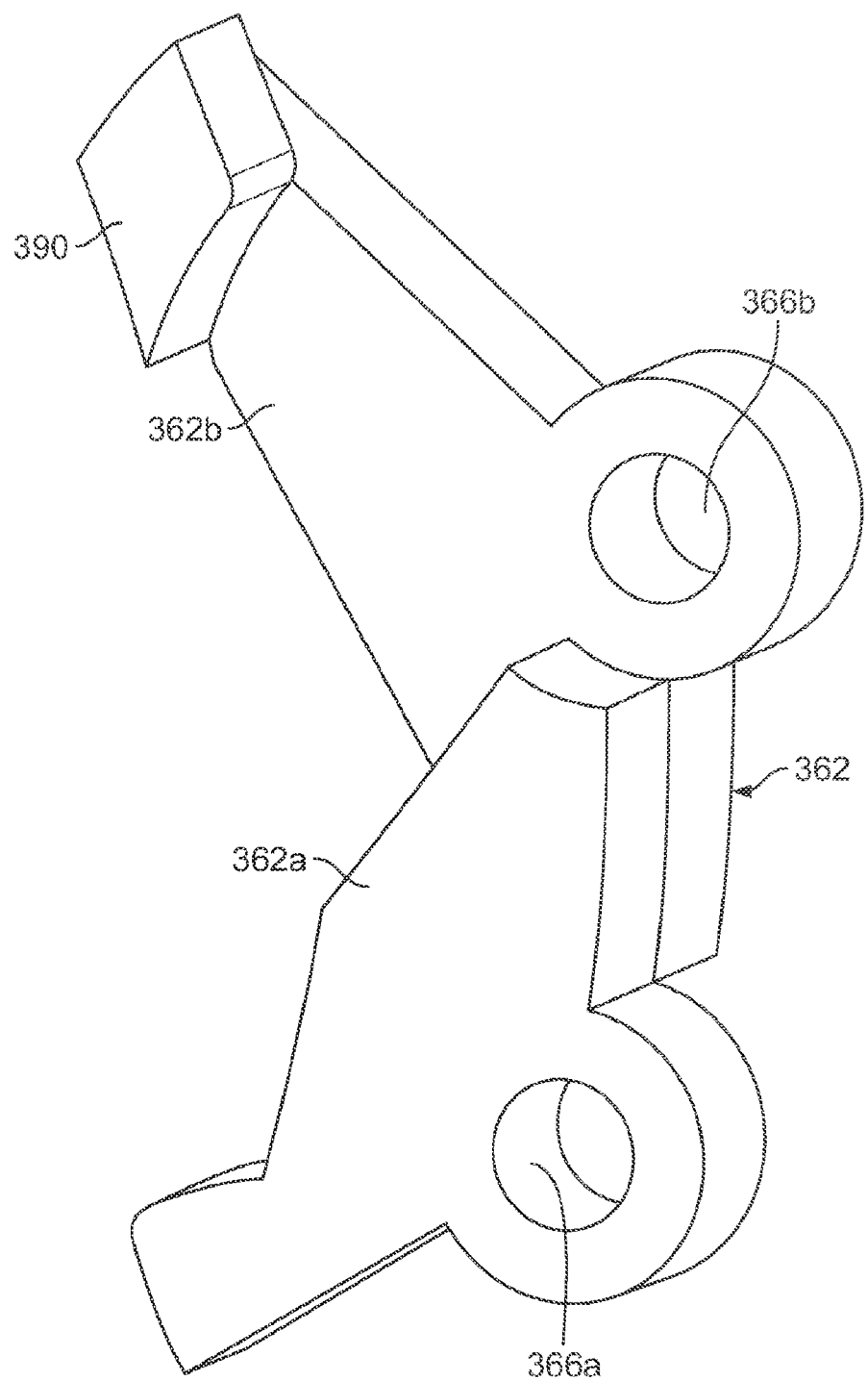
FIG. 20 is a perspective view of one link of a locking chain.

Referring now to FIG. 20, and individual link 362 of locking chain 360 is shown in isolation. Locking chain 360 is made up of identical rigid links 362, with each link having three geometric features: 1) a link portion or bottom structure 362b that includes a bore 366b, 2) a link portion or top structure 362a with a bore 366a, and 3) a pivot block or locking structure 390. A bore 366a of one link 362 is joined with a bore 366b of another link with a pivot pin 364 to pivotally connect the two links together. Pivot pin 364 can join multiple links together in a pivotable connection thus forming a chain.

Figure 21:
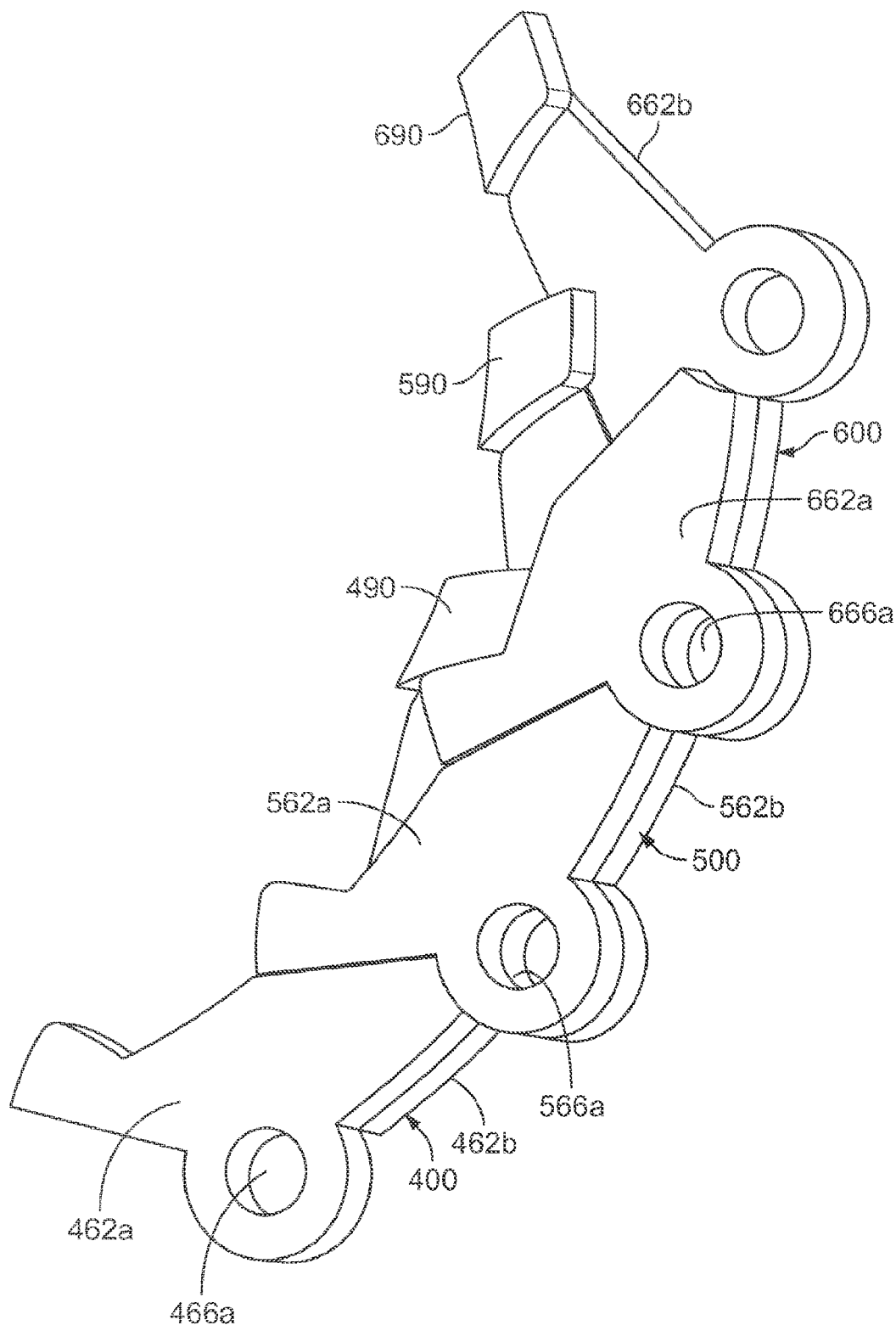
FIG. 21 is a perspective view of three links of a locking chain that have two of the three links locked by the third.

Referring now to FIG. 21, a section of a locking chain is shown with three links 400, 500 and 600 joined together. Links 400, 500, 600 can be locked together in a rigid arc. A locking structure 490 on link 400 is engaged with the top structure 662a of link 600, preventing the rotation in a clockwise fashion of that link about its pivot axis in bore 666a. Top structure 562a of link 500 prevents rotation of link 600 rotating in a counterclockwise fashion about its axis in bore 666a. Note that this condition occurs when link 500 has rotated about its axis in 566a far enough that top structure 562a has abutted against top structure 662a. In addition, locking structure 490 from link 400 will have engaged 662a when link 400 has rotated about its axis in bore 466b far enough that top structure 462a has abutted against top structure 562a. Thus, link 500 and link 600 are locked in a position which forms a portion of an arc. As will be appreciated by anyone skilled in the art, this arc could have any radius including an infinite radius forming a straight line.

Locking chains in accordance with the invention can feature links having a variety of different interlocking geometries, and need not have the geometries of those shown thus far. FIGS. 22A-22H illustrate another example of a link geometry that can be used to form a locking chain for a joint attachment in accordance with the invention. Referring to FIGS. 22A-22D, an individual link 700 is shown. Link 700 includes a first link portion 700a and a second link portion 700b. First link portion 700a includes a bore 710. Second link portion 700b includes a post or axle 720 projecting from the second link portion. Bore 710 has a diameter that is slightly larger than the diameter of post 720. In this arrangement, bore 720 is adapted to receive a post 710 of another identical link to pivotally attach the two links together.

Referring to FIGS. 22E-22H, link 700 is shown connected to four other identical links 700', 700", 700'" and 700"" in a chain. Link 700' is connected to link 700 by axially aligning bore 710' with post 720, and then inserting post 720 through bore 710'. First link portion 700a' of link 700' can be partially advanced over post 720 of link 700, so that first link portion 700a' is out of plane with (i.e. offset from or outside the plane of) first link portion 700a of link 700. In this position, link 700' is in an unlocked state that allows it to pivot and articulate relative to link 700. When first link portion 700a' of link 700' is fully advanced over post 720 of link 700, so that first link portion 700a' abuts second link portion 700b of link 700, link 700' is in a locked state that prevents it from pivoting or articulating relative to link 700. Links 700', 700", 700'" and 700"" are connected to one another in a connection identical to the connection between links 700 and 700'. In this arrangement, each link can be locked and unlocked relative to an adjacent link.

Figure 22A:
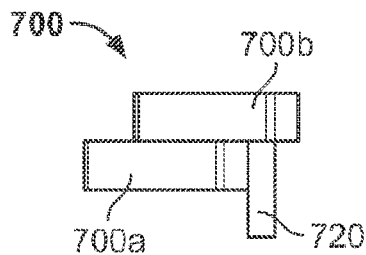
FIGS. 22A-22H provide perspective views of links for forming a locking chain in accordance with another embodiment of the invention.
Figure 22B:
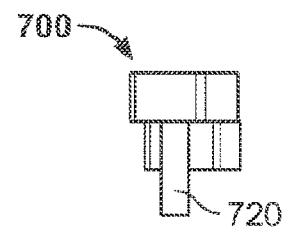
Figure 22C:
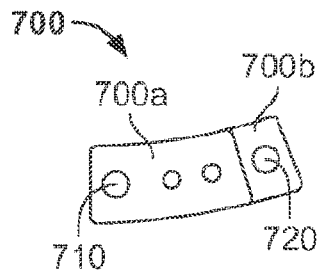
Figure 22D:
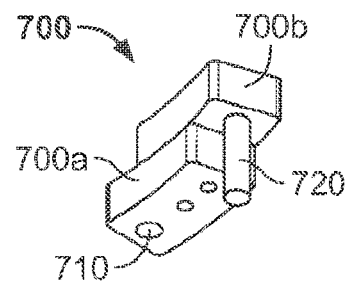
Figure 22E:
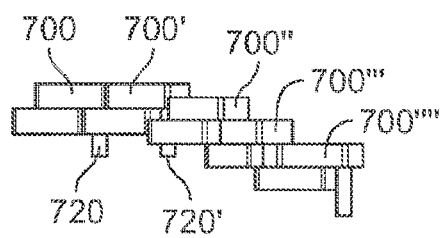
Figure 22F:
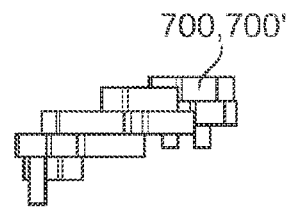
Figure 22G:
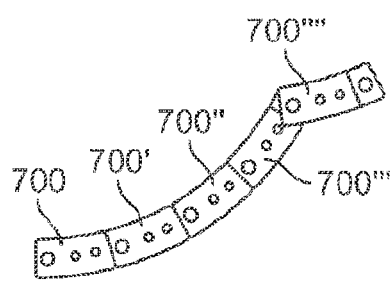
Figure 22H:
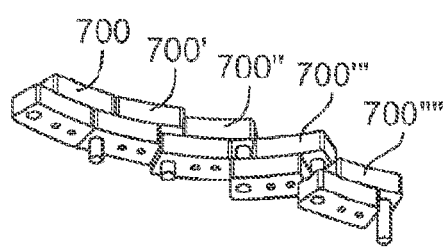

Referring to FIGS. 22G and 22H, links 700 and 700' are fully connected and locked to one another in a rigid arc, similar to the previous locking chain. In contrast, link 700'" is shown in an unlocked condition relative to link 700", allowing the former to pivot relative to the latter.

FIGS. 23A-23I illustrate additional examples of link geometries that can be used to form a locking chain for a joint attachment in accordance with the invention. In these examples, there are two link configurations that compose a locking chain. FIGS. 23A-23D show a first or "right-hand" link 810, and FIGS. 23E-23H show a second or "left-hand" link 820. Each first link 810 features a hook 812 and a recess 814. Recess 814 is adapted to receive a hook 812 on a neighboring link 810. Similarly, each second link 820 features a hook 822 and a recess 824. Recess 824 is adapted to receive a hook on a neighboring link 820. A series of first links 810 can be interconnected by inserting hooks 812 into neighboring recesses 814, and a series of second links 820 can be interconnected by inserting hooks 822 into neighboring recesses 824. Each first link 810 has pin 830 configured for insertion into an aperture 840 on a second link 820. In this arrangement, a series of first links 810 can be coupled to a series of second links 820 by inserting pivot pins 830 into corresponding apertures 840.

When a series of first links 810 is intermeshed with a series of second links 820, with all hooks inserted into corresponding recesses, and all pins 830 inserted into corresponding apertures 840, the first and second links are locked together to form a rigid arc-shaped chain. When the hook of one link is removed from its corresponding recess, that link is moved to an unlocked condition in which it can pivot relative to the chain. FIG. 23I shows a chain of links in which the left-most link 820 is pivoted to an unlocked state, and the remaining links are locked together in a rigid arc.

Figure 24:
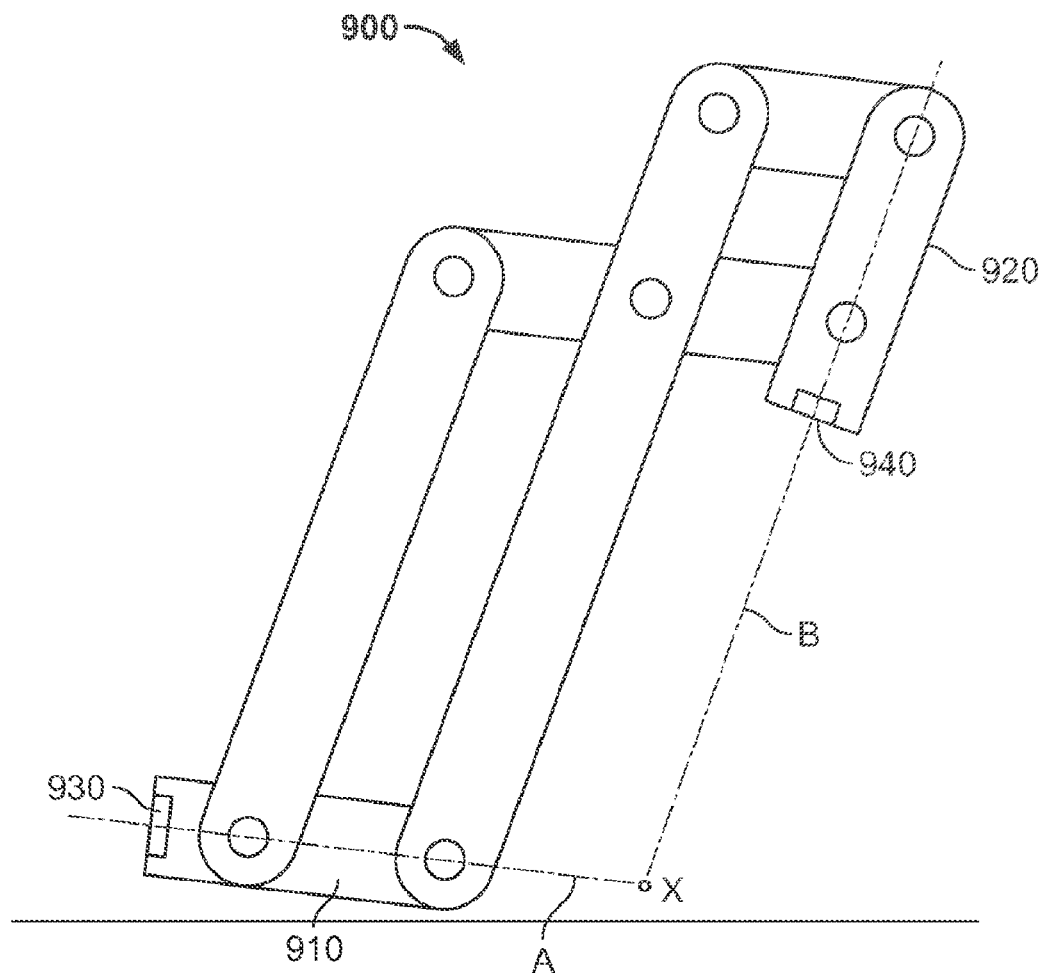
FIG. 24 is a plan view of a truss element or body member in accordance with another embodiment of the invention.

Referring now to FIG. 24, a reconfigurable truss section or "body member" 900 is shown in accordance with another embodiment. Body member 900 features a plurality of struts connected to one another by pins or other pivot joints. A first strut 910 defines a first joint line A, and a second strut 920 defines a second joint line B. Joint lines A and B intersect at a point X, which defines a center point of concentricity for body member 900. Strut 910 includes a first connector or disk 930, and strut 920 includes a second connector or disk 940. First connector 930 and second connector 940 can be used to connect body member 900 to other truss sections.

Figure 25:
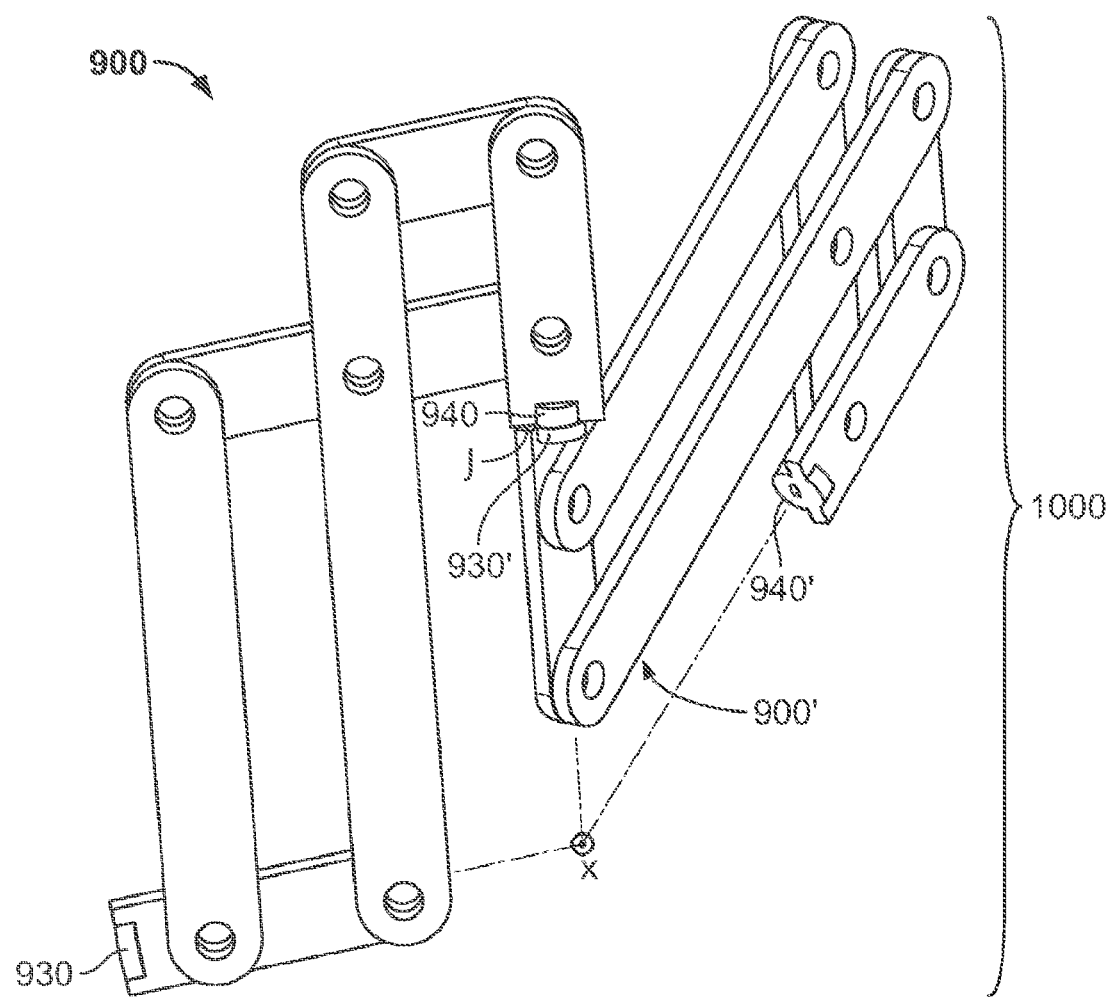
FIG. 25 is a perspective view of the truss element or body member of FIG. 24 combined with a second truss element or body member.

Referring now to FIG. 25, two truss sections or body members 900 and 900' are shown connected to together to form a truss system 1000. Body member 900 has a first connector 930 and a second connector 940. Similarly, body member 900' has a first connector 930' and a second connector 940'. Second connector 940 of body member 900 is pivotally coupled to first connector 930' of body member 900', forming a revolute joint J between the two body members. First connector 930 of body member 900 and second connector 940' of body member 900' are free, allowing for other body members to be added to truss system 1000. First and second connectors in accordance with the invention can have various configurations to form revolute joints, including but limited to pins and sockets, and other configurations.

Figure 26:
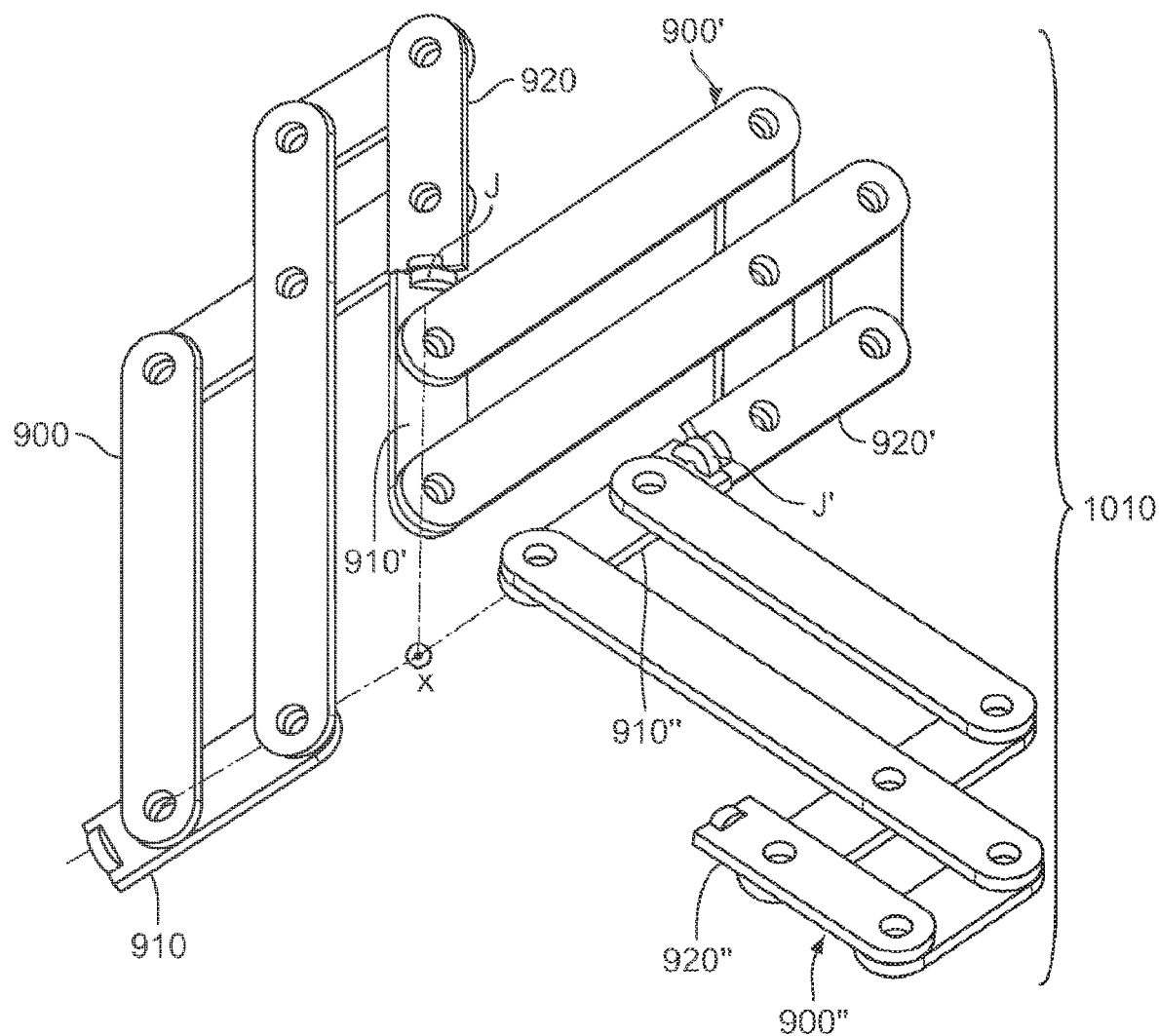
FIG. 26 is a perspective view of the truss elements or body members of FIG. 25 combined with a third truss element or body member.

Referring to FIG. 26, a third truss section or body member 900" is added to body members 900 and 900' to form a larger truss system 1010. In this system, three body members 900, 900' and 900" are interconnected by two revolute joints J and J'. Body member 900 has a first strut 910 and a second strut 920, body member 900' has a first strut 910' and a second strut 920', and body member 900" has a first strut 910" and a second strut 920". The first and second struts each define respective joint lines. All of the joint lines intersect one another at a single point X that defines a center point of concentricity for truss sections 900, 900' and 900".

Unlike closed truss systems that feature linkages, truss systems in accordance with the invention, such as truss systems 1000 and 1010 shown in FIGS. 25 and 26, are open systems that allow truss sections to be added to, or removed from the truss system. The geometries of the linkages allow truss sections to be chained to existing truss sections and maintain true concentricity with those truss sections relative to a single point.

While preferred embodiments of the invention have been shown and described herein, it will be understood that such embodiments are provided by way of example only. Numerous variations, changes, combinations and substitutions will occur to those skilled in the art without departing from the spirit of the invention. Accordingly, it is intended that the appended claims cover all such variations as fall within the scope of the invention.

What is claimed:

1. A structural member, comprising:
a body member comprising a plurality of interconnected struts that comprises a first strut that extends along a first axis and defines a first end of the body member, and a second strut that extends along a second axis and defines a second end of the body member, wherein the first strut includes a first location configured to pivotally couple to a third strut, and wherein the first strut includes a second location configured to pivotally couple to a fourth strut, the second location being offset from the first location along the first axis;
a first connector at the first end of the body member, the first connector configured to connect the first strut of the body member to a corresponding connector of a corresponding strut of a second structural member in series such that the corresponding strut extends along the first axis from the first connector and rotates about the first axis relative to the first strut, wherein the first connector is positioned between the first strut and the corresponding strut along the first axis when the first strut is connected to the corresponding strut; and a second connector at the second end of the body member, the second connector configured to connect the body member to a third structural member such that the third structural member rotates about the second axis relative to the structural member, wherein the first axis and the second axis intersect one another at a single point, wherein the connectors are selected from the group consisting of magnetic or electrostatic forces, chemical bonds, an adhesive, van der Waals forces or a phase change material, a press fit connection, and an interference fit.

2. The structural member of claim 1, wherein the interconnected struts of the plurality of interconnected struts are connected to one another by pivot joints.

3. The structural member of claim 1, wherein the interconnected struts of the plurality of interconnected struts comprise six interconnected struts.

4. The structural member of claim 1, wherein the interconnected struts comprise the third strut pivotally coupled to the first strut at the first location, and the fourth strut pivotally coupled to the first strut at the second location.

5. The structural member of claim 4, wherein the first connector is located along the first axis at a location closest to the single point intersection of the first axis and the second axis relative to both of the first location and the second location.

6. The structural member of claim 4, wherein the first connector is located along the first axis such that both of the first location and the second location are located between the first connector and the single point intersection of the first axis and the second axis.

7. The structural member of claim 4, wherein the interconnected struts comprise a fifth strut that is pivotally coupled to the second, third, and fourth struts.

8. The structural member of claim 7, wherein the interconnected struts comprise a sixth strut that is pivotally coupled to the second strut and the third strut.

9. The structural member of claim 1, wherein each of the first and second connectors forms a revolute joint.

10. The structural member of claim 1, wherein the first connector is positioned at a location at the first end of the body member and faces in a direction that opposes the single point intersection of the first axis and the second axis, and wherein the second connector is positioned at a location at the second end of the body member that faces in a direction toward the single point intersection of the first axis and the second axis.

11. A structural truss system comprising a plurality of structural members, each structural member comprising:
a body member comprising a plurality of interconnected struts that comprise a first strut that extends along a first axis and defines a first end of the body member, and a second strut that extends along a second axis and defines a second end of the body member, wherein the first axis intersects the second axis at a single point, wherein the first strut includes a first location configured to pivotally couple to a third strut, and wherein the first strut includes a second location configured to pivotally couple to a fourth strut, the second location being offset from the first location along the first axis;
a first connector at the first end of the body member, and a second connector at the second end of the body member, wherein the second connector of a second structural member of the plurality of structural members is connected to the first connector of a first structural member of the plurality of structural members in series such that the first and second structural members rotate relative to one another about the first axis, wherein the connectors are selected from the group consisting of magnetic or electrostatic forces, chemical bonds, an adhesive, van der Waals forces or a phase change material, a press fit connection, and an interference fit, and wherein the first connector is positioned at a location at the first end of the body member and faces in a direction that opposes the single point intersection of the first axis and the second axis, and wherein the second connector is positioned at a location at the second end of the body member that faces in a direction toward the single point intersection of the first axis and the second axis.

12. The structural truss system of claim 11, wherein the second axis of the second structural member intersects the first and second axes of the first structural member at a single point.

13. The structural truss system of claim 11, wherein the first connector of a third structural member of the plurality of structural members is connected to the second connector of the first structural member such that the first and third structural members rotate relative to one another about the second axis.

14. The structural truss system of claim 13, wherein the first axis of the third structural member intersects the first and second axes of the first structural member at a single point.

15. The structure member of claim 11, wherein, for each of the structural members, the interconnected struts are connected to one another by pivot joints.

16. The structural truss system of claim 11, wherein, for each of the structural members, the interconnected struts comprise six interconnected struts.

17. The structural truss system of claim 11, wherein each structural member comprises the third strut pivotally coupled to the first strut of the structural member at the first location, and the fourth strut pivotally coupled to the first strut of the structural member at the second location.

18. The structural truss system of claim 17, wherein each structural member comprises a fifth strut that is pivotally coupled to the second, third, and fourth struts of the structural member.

19. The structural truss system of claim 18, wherein each structural member comprises a sixth strut that is pivotally coupled to the second and third struts of the structural member.

20. The structural truss system of claim 11, wherein each of the first and second connectors forms a revolute joint.

21. A joint attachment system for a reconfigurable truss, the joint attachment system comprising:
a first attachment assembly for pivotally attaching a first body member of the truss to a second body member of the truss, the first attachment assembly having a first pivot axis; and
a second attachment assembly for pivotally attaching the second body member of the truss to a third body member of the truss, the second attachment assembly having a second pivot axis, wherein the first, second, and third body members are attachable in series, each of the first and second attachment assemblies include a first connector and a second connector, wherein the first connector and the second connector of the first attachment assembly are positioned relative to one another such that the first and second connectors of the first attachment assembly are connected by translating the first connector of the first attachment assembly relative to the second connector of the first attachment assembly along the first pivot axis, and wherein the first connector and the second connector of the second attachment assembly are positioned relative to one another such that the first and second connectors of the second attachment assembly are connected by translating the first connector of the second attachment assembly relative to the second connector of the second attachment assembly along the second pivot axis, the first attachment assembly and the second attachment assembly forming a concentric spherical joint linkage when the first body member is attached to the second body member, wherein the first pivot axis of the first attachment assembly intersects the second pivot axis of the second attachment assembly at a single point which defines a center of the concentric spherical joint linkage, and the concentric spherical joint linkage being configured to allow the addition of one or more joint attachments and body members to the truss, and the concentric spherical joint linkage being further configured to allow the removal of one or more joint attachments and body members from the truss.

* * * * *